US012692195B2

(12) United States Patent
Mizuno

(10) Patent No.: US 12,692,195 B2
(45) Date of Patent: Jul. 28, 2026

(54) LAMINATED CERAMIC CAPACITOR AND METHOD OF MANUFACTURING LAMINATED CERAMIC CAPACITOR

(71) Applicant: TAIYO YUDEN CO., LTD., Tokyo (JP)

(72) Inventor: Kotaro Mizuno, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 110 days.

(21) Appl. No.: 18/744,047

(22) Filed: Jun. 14, 2024

(65) Prior Publication Data

US 2025/0002416 A1 Jan. 2, 2025

(30) Foreign Application Priority Data

Jun. 29, 2023 (JP) ................................. 2023-107462

(51) Int. Cl.
| | |
|---|---|
| *C04B 35/468* | (2006.01) |
| *C04B 35/64* | (2006.01) |
| *H01G 4/008* | (2006.01) |
| *H01G 4/012* | (2006.01) |
| *H01G 4/30* | (2006.01) |

(52) U.S. Cl.
CPC .......... *C04B 35/4682* (2013.01); *C04B 35/64* (2013.01); *H01G 4/008* (2013.01); *H01G 4/012* (2013.01); *H01G 4/30* (2013.01); *C04B 2235/6583* (2013.01)

(58) Field of Classification Search
CPC ........ H01G 4/30; H01G 4/008; H01G 4/1227; H01G 4/129; H01G 4/40; H01G 4/012; C04B 35/4682; C04B 35/64; C04B 2235/6583
See application file for complete search history.

(56) References Cited

U.S. PATENT DOCUMENTS

| | | | | |
|---|---|---|---|---|
| 9,236,185 | B1* | 1/2016 | Oguni | .................. H01G 4/1227 |
| 2009/0237859 | A1* | 9/2009 | Nakamura | ............... H01G 4/33 |
| | | | | 156/89.12 |

(Continued)

FOREIGN PATENT DOCUMENTS

JP 2009-084111 A 4/2009

*Primary Examiner* — Michael P McFadden
(74) *Attorney, Agent, or Firm* — CUSHMAN PARTNERS, LLC

(57) ABSTRACT

Provided is a laminated ceramic capacitor having a capacitance less reduced by a sintering agent. A laminated ceramic capacitor according to one aspect of the invention includes a body having a first internal electrode layer, a second internal electrode layer, and a ceramic layer disposed therebetween. The ceramic layer is formed from ceramic material containing a sintering agent composed mainly of a sintering agent element. The first internal electrode layer includes an electrode part and a non-electrode part, the electrode part being formed of a sintered compact of a main component metal element, the non-electrode part being surrounded by the electrode part. The non-electrode part contains the sintering agent element. A first concentration indicating a concentration of the sintering agent element in the non-electrode part is higher than a second concentration indicating the same in an interface between the first internal electrode layer and the ceramic layer.

15 Claims, 7 Drawing Sheets

(56)  References Cited

U.S. PATENT DOCUMENTS

| 2012/0162858 | A1* | 6/2012 | Tanaka | H01G 4/1227 |
| | | | | 361/321.4 |
| 2016/0118191 | A1* | 4/2016 | Kanzaki | H01G 4/0085 |
| | | | | 361/301.4 |
| 2020/0312570 | A1* | 10/2020 | Hashimoto | H01G 4/1227 |
| 2021/0202171 | A1* | 7/2021 | Tsutsui | H01G 4/248 |
| 2022/0148812 | A1* | 5/2022 | Tsutsui | H01G 4/012 |
| 2022/0277897 | A1* | 9/2022 | Mizuno | C22C 19/03 |
| 2022/0392704 | A1* | 12/2022 | Iguchi | H01G 4/008 |
| 2023/0290576 | A1* | 9/2023 | Mizuno | H01G 4/008 |
| 2025/0292962 | A1* | 9/2025 | Hirata | H01G 4/1227 |

* cited by examiner

LAMINATED CERAMIC CAPACITOR AND METHOD OF MANUFACTURING LAMINATED CERAMIC CAPACITOR

CROSS-REFERENCE TO RELATED APPLICATIONS

This application is based on and claims the benefit of priority from Japanese Patent Application Serial No. 2023-107462 (filed on Jun. 29, 2023), the contents of which are hereby incorporated by reference in their entirety.

TECHNICAL FIELD

The disclosure herein relates mainly to a laminated ceramic capacitor and a method of manufacturing the laminated ceramic capacitor. The disclosure herein also relates to a circuit module with the laminated ceramic capacitor and an electronic device with the circuit module.

BACKGROUND

Laminated ceramic capacitors are used in various electronic devices. Laminated ceramic capacitors are produced by stacking lamination units each having an internal electrode pattern formed on the surface of a ceramic green sheet containing ceramic powder to form a green laminate, and then firing this green laminate. It is known that addition of a sintering agent to the ceramic green sheets can promote the sintering of the ceramic powder through a low-temperature firing process. Examples of known sintering agents include Si (silicon), which forms the liquid phase during the firing process. A conventional laminated ceramic capacitor produced with ceramic green sheets containing a sintering agent added thereto is disclosed in Japanese Patent Application Publication No. 2009-084111.

Since the relative permittivity of a sintering agent is lower than that of the main phase oxide (e.g., barium titanate) of the ceramic green sheets, the capacitance of the laminated ceramic capacitor is reduced as the amount of sintering agent added increases. On the other hand, if the amount of sintering agent added is small, the ceramic layers do not densify sufficiently when the green laminate is sintered at low temperatures.

SUMMARY

It is an object of the present disclosure to solve or alleviate at least part of the drawback mentioned above. One of more particular objects of the disclosure is to provide a laminated ceramic capacitor having a capacitance less reduced by a sintering agent.

Other objects of the disclosure will be made apparent through the entire description in the specification. The invention disclosed herein may also address drawbacks other than that grasped from the above description. When an advantageous effect of an embodiment is described herein, the advantageous effect suggests an object of the invention corresponding to the embodiment.

The various inventions disclosed herein may be simply referred to as "the invention". A laminated ceramic capacitor according to one aspect of the invention includes a body having a first internal electrode layer, a second internal electrode layer, and a ceramic layer disposed between the first internal electrode layer and the second internal electrode layer. The ceramic layer is formed from ceramic material containing a sintering agent composed mainly of a sintering agent element. A first external electrode is provided on the body so as to be electrically connected to the first internal electrode layer. A second external electrode is provided on the body so as to be electrically connected to the second internal electrode layer. The first internal electrode layer includes an electrode part and a non-electrode part, the electrode part being formed of a sintered compact of a main component metal element, the non-electrode part being surrounded by the electrode part. The non-electrode part contains the sintering agent element. A first concentration indicating a concentration of the sintering agent element in the non-electrode part is higher than a second concentration indicating a concentration of the sintering agent element in an interface between the first internal electrode layer and the ceramic layer.

Advantageous Effects

According to one embodiment of the invention disclosed herein, it is possible to provide a laminated ceramic capacitor having a capacitance less reduced by a sintering agent.

DESCRIPTION OF THE PREFERRED EMBODIMENTS

Figure 1:
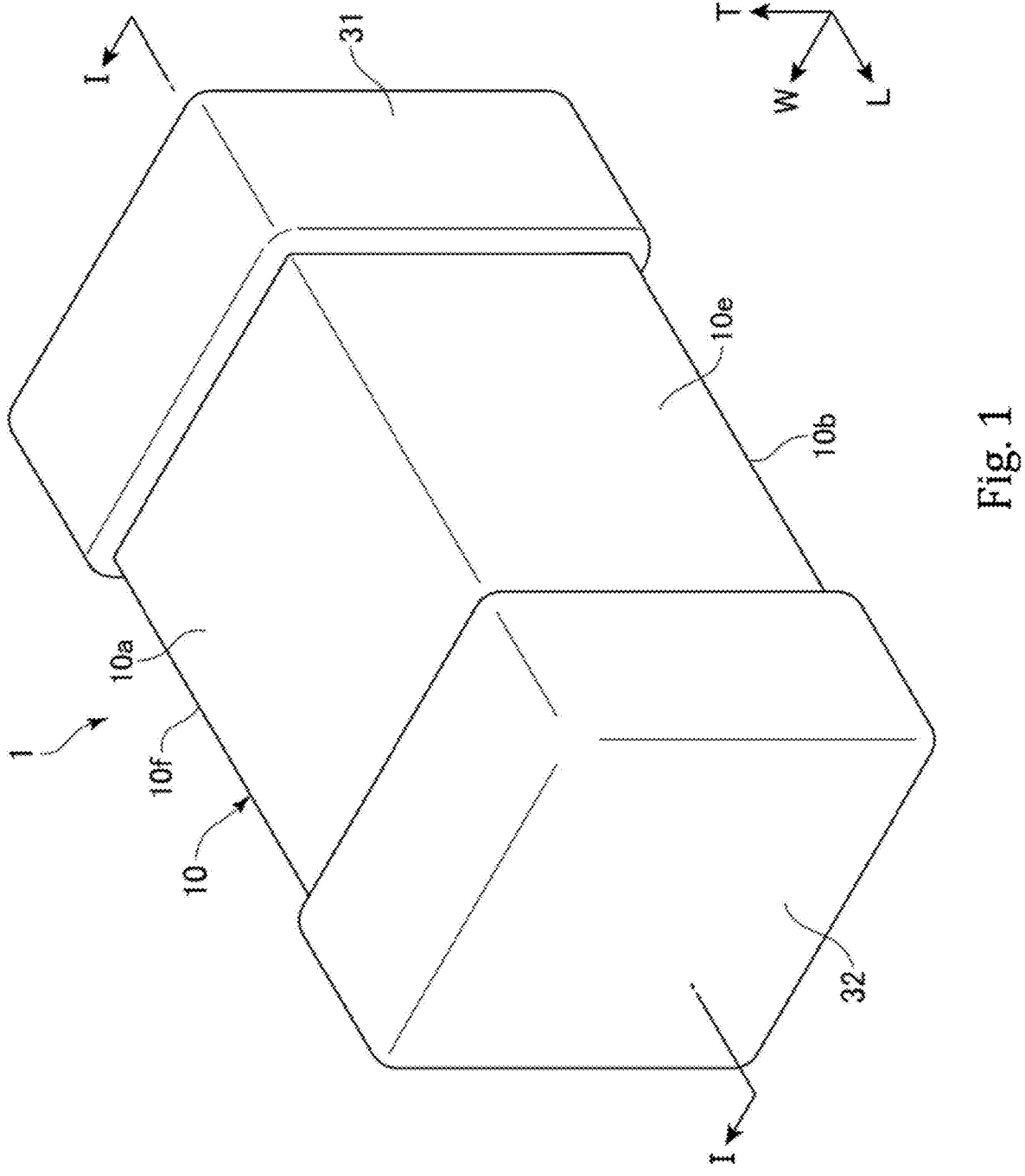
FIG. 1 is a perspective view schematically showing a laminated ceramic capacitor according to one embodiment of the disclosure.

Various embodiments of the disclosure will be described hereinafter with reference to the appended drawings. Throughout the drawings, the same components are denoted by the same or like reference numerals. For convenience of explanation, the drawings are not necessarily drawn to scale. The following embodiments of the disclosure do not limit the scope of the claims. The elements included in the following embodiments are not necessarily essential to solve the problem addressed by the invention.

For convenience of explanation, each of the drawings may show the L axis, the W axis, and the Taxis orthogonal to one another. In this specification, the dimensions, arrangement, shape, and other features of each component of a laminated ceramic capacitor 1 may be described with reference to the L, W, and T axes.

(1) Laminated Ceramic Capacitor 1

(1-1) Basic Structure of Laminated Ceramic Capacitor 1

Figure 2:
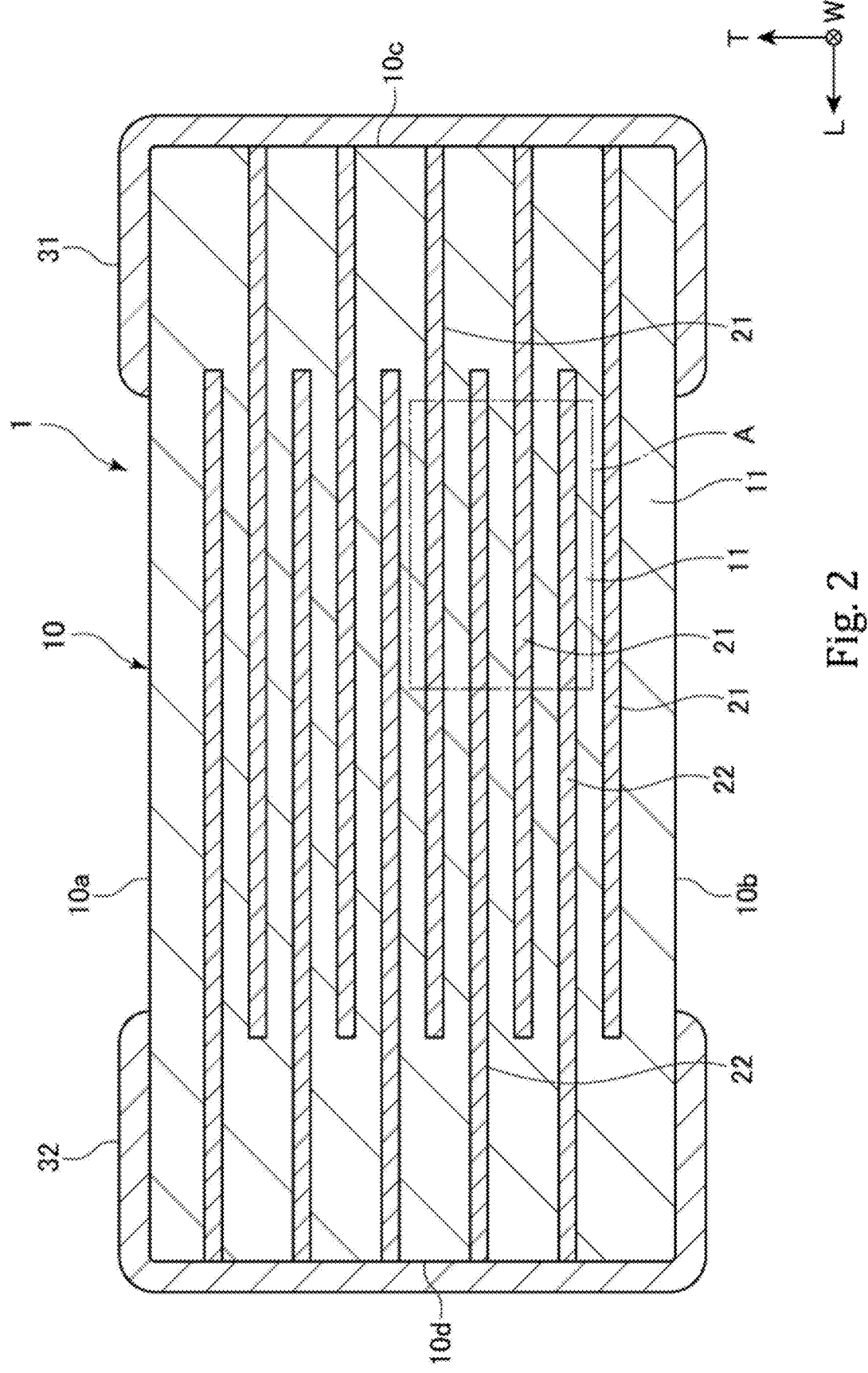
FIG. 2 is a sectional view schematically showing a section of the capacitor of FIG. 1 cut along the line I-I.

Referring to FIGS. 1 and 2, a description will now be given of the basic structure of a laminated ceramic capacitor 1 according to the first embodiment. FIG. 1 is a perspective view showing the laminated ceramic capacitor 1 according to the first embodiment. FIG. 2 is a sectional view schematically showing a section of the laminated ceramic capacitor 1 cut along the line I-I.

The laminated ceramic capacitor 1 has a body 10, a first external electrode 31 and a second external electrode 32 provided on the body 10. The first external electrode 31 is spaced apart from the second external electrode 32. In the example shown in FIG. 2, the first external electrode 31 is spaced apart from the second external electrode 32 in the L-axis direction.

The body 10 includes a plurality of ceramic layers 11, a plurality of first internal electrode layers 21, and a plurality of second internal electrode layers 22. A ceramic layer 11 is present between a first internal electrode layer 21 and a second internal electrode layer 22 adjacent to the first internal electrode layer 21. In this specification, the first internal electrode layers 21 and the second internal electrode layers 22 may be referred to collectively as "the internal electrode layers" when it is not necessary to distinguish the first internal electrode layers 21 and the second internal electrode layers 22 from each other.

The body 10 has a top surface 10*a*, a bottom surface 10*b*, a first end surface 10*c*, a second end surface 10*d*, a first side surface 10*e*, and a second side surface 10*f*. The outer surface of the body 10 is defined by the top surface 10*a*, the bottom surface 10*b*, the first end surface 10*c*, the second end surface 10*d*, the first side surface 10*e*, and the second side surface 10*f*.

The top surface 10*a* and the bottom surface 10*b* form the opposite ends of the body 10 in the height direction (T-axis direction). In other words, the top surface 10*a* and the bottom surface 10*b* are opposed to each other in the T-axis direction. The first end surface 10*c* and the second end surface 10*d* form the opposite ends of the body 10 in the length direction (L-axis direction). In other words, the first end surface 10*c* and the second end surface 10*d* are opposed to each other in the L-axis direction. The first side surface 10*e* and the second side surface 10*f* form the opposite ends of the body 10 in the width direction (W-axis direction). In other words, the first side surface 10*e* and the second side surface 10*f* are opposed to each other in the W-axis direction. The top surface 10*a* and the bottom surface 10*b* are separated from each other by a distance equal to the height of the body 10, the first end surface 10*c* and the second end surface 10*d* are separated from each other by a distance equal to the length of the body 10, and the first side surface 10*e* and the second side surface 10*f* are separated from each other by a distance equal to the width of the body 10.

The body 10 is composed of the ceramic layers 11, the first internal electrode layers 21, and the second internal electrode layers 22 stacked together along the lamination direction. In the illustrated embodiment, the ceramic layers 11, the first internal electrode layers 21, and the second internal electrode layers 22 are stacked together along the T-axis direction. The lamination direction may be along the T axis, as shown in the drawings, or may be along the L or W axis. The ceramic layers 11 located at the opposite ends in the lamination direction may be referred to as cover layers.

In the illustrated embodiment, the body 10 is constituted by the ceramic layers 11, the first internal electrode layers 21, and the second internal electrode layers 22 stacked together along the T-axis direction. Therefore, the T-axis direction may be referred to as the lamination direction. An upper cover layer may be provided on the top surface of the laminate. A lower cover layer may be provided on the bottom surface of the laminate. The upper cover layer and the lower cover layer may be formed of the same material as the ceramic layers 11. The upper cover layer and the lower cover layer may be a part of the body 10.

Each of the first internal electrode layers 21 has one end led toward the outside of the body 10. The first internal electrode layer 21 is connected to the first external electrode 31 provided on the surface of the body 10. Each of the second internal electrode layers 22 has one end led toward the outside of the body 10. The second internal electrode layer 22 is connected to the second external electrode 32 provided on the surface of the body 10. In the illustrated embodiment, the first internal electrode layer 21 is led from one end in the L-axis direction toward the outside of the body 10. The first internal electrode layer 21 is connected to the first external electrode 31 at one end of the body 10 in the L-axis direction. The second internal electrode layer 22 is led from the other end in the L-axis direction toward the outside of the body 10. The second internal electrode layer 22 is connected to the second external electrode 32 at the other end of the body 10 in the L-axis direction. In the example shown in FIG. 2, the first and second internal electrode layers 21 and 22 are led out to the first and second end surfaces 10*c* and 10*d*, respectively, but the first and second internal electrode layers 21 and 22 can be led out through various surfaces of the body 10 in accordance with the locations and the shapes of the first and second external electrodes 31 and 32. For example, if both the first and second external electrodes 31 and 32 are located on the bottom surface 10*b*, both the first and second internal electrode layers 21 and 22 are led out through the bottom surface. The first and second external electrodes 31 and 32 may be located on any of the surfaces of the body 10 as long as they are separated from each other.

When voltage is applied between the first and second external electrodes 31 and 32, capacitance is generated between the first and second internal electrode layers 21 and 22.

As will be described later, a first intermediate layer 51 may be located between the ceramic layer 11 and the first internal electrode layer 21, and a second intermediate layer 52 may be located between the ceramic layer 11 and the second internal electrode layer 22. In FIGS. 1 and 2, the first and second intermediate layers 51 and 52 are not shown. In this specification, the first intermediate layers 51 and the second intermediate layers 52 may be referred to collectively as "the intermediate layers" when it is not necessary to distinguish the first intermediate layers 51 and the second intermediate layers 52 from each other.

FIG. 2 shows five each of the first and second internal electrode layers 21 and 22 for simplicity of illustration, but the laminated ceramic capacitor 1 may include any number of layers stacked together. The laminated ceramic capacitor 1 may include, for example, 300 to 1000 layers formed of the first and second internal electrode layers 21 and 22. In other words, the number of stacked layers in the laminated ceramic capacitor 1 may be 300 to 1000.

The laminated ceramic capacitor 1 may be mounted on an electronic circuit board (not shown). The electronic circuit board having the laminated ceramic capacitor 1 mounted thereon may be referred to as a circuit module. Various electronic components other than the laminated ceramic capacitor 1 may also be mounted on the circuit module. The circuit module may be installed in various electronic devices. The electronic devices in which the circuit module can be installed include smartphones, tablets, game consoles, electrical components of automobiles, servers, and various other electronic devices.

In one aspect, the body 10 may be configured to have a rectangular parallelepiped shape. The term "rectangular parallelepiped" or "rectangular parallelepiped shape" used herein is not intended to mean solely "rectangular parallelepiped" in a mathematically strict sense. As described later, the corners and/or edges of the body 10 may be rounded. The dimensions and the shape of the body 10 are not limited to those specified herein.

In one aspect, the laminated ceramic capacitor 1 has a dimension in the L axis direction (length) of 0.2 mm to 2.5 mm, a dimension in the W axis direction (width) of 0.1 mm to 3.5 mm, and a dimension in the T axis direction (height) of 0.1 mm to 3.0 mm. In one aspect, the length of the laminated ceramic capacitor 1 may be larger than the width thereof. In one aspect, the height of the laminated ceramic capacitor 1 may be larger than the width thereof. In one aspect, the width of the laminated ceramic capacitor 1 may be larger than the length thereof.

(1-2) First Internal Electrode Layers 21 and Second Internal Electrode Layers 22

(1-2-1) Composition of First Internal Electrode Layers 21 and Second Internal Electrode Layers 22

In one aspect, the first internal electrode layers 21 contain a base metal such as Ni (nickel), Cu (copper), and Sn (tin), as the main component thereof. A component that is at least 50 wt % of the first internal electrode layers 21 with reference to the total mass of the first internal electrode layers 21 can be regarded as the main component of the first internal electrode layers 21. The first internal electrode layers 21 preferably contain 60 wt % or more, 70 wt % or more, 80 wt % or more, or 90 wt % or more the base metal as the main component thereof.

The first internal electrode layers 21 can contain secondary elements in addition to the main component metal element. The secondary elements that can be contained in the first internal electrode layers 21 are one or more than one element selected from the group consisting of, for example, As (arsenic), Au (gold), Co (cobalt), Cr (chromium), Cu, Fe (iron), In (indium), Ir (iridium), Mg (magnesium), Os (osmium), Pd (palladium), Pt (platinum), Re (rhenium), Rh (rhodium), Ru (ruthenium), Se (selenium), Sn, Ge (germanium), Te (tellurium), W (tungsten), Y (yttrium), Ag (silver), and Mo (molybdenum). The main component metal element and the secondary elements are separate elements. For example, when the main component metal element is Ni, Sn can be employed as a secondary element, but when the main component metal element is Sn, Sn cannot be selected as a secondary element.

In one aspect, the internal electrode layers can contain 0.01 at % to 5 at % the secondary elements relative to 100 at % the main component metal element. When the internal electrode layers contain two or more elements as secondary elements, the total concentration of these two or more secondary elements is 0.01 at % to 5 at %.

The description of the components of the first internal electrode layers 21 also applies to the components of the second internal electrode layers 22.

In an aspect, the thickness (the dimension in the T-axis direction) of the first internal electrode layers 21 is 0.1 μm to 2 μm. In one aspect, the thickness of the first internal electrode layers 21 is preferably 0.4 μm or less. The description of the thickness of the first internal electrode layers 21 also applies to the thickness of the second internal electrode layers 22.

(1-2-2) Electrode Part and Non-Electrode Part

Figure 3:
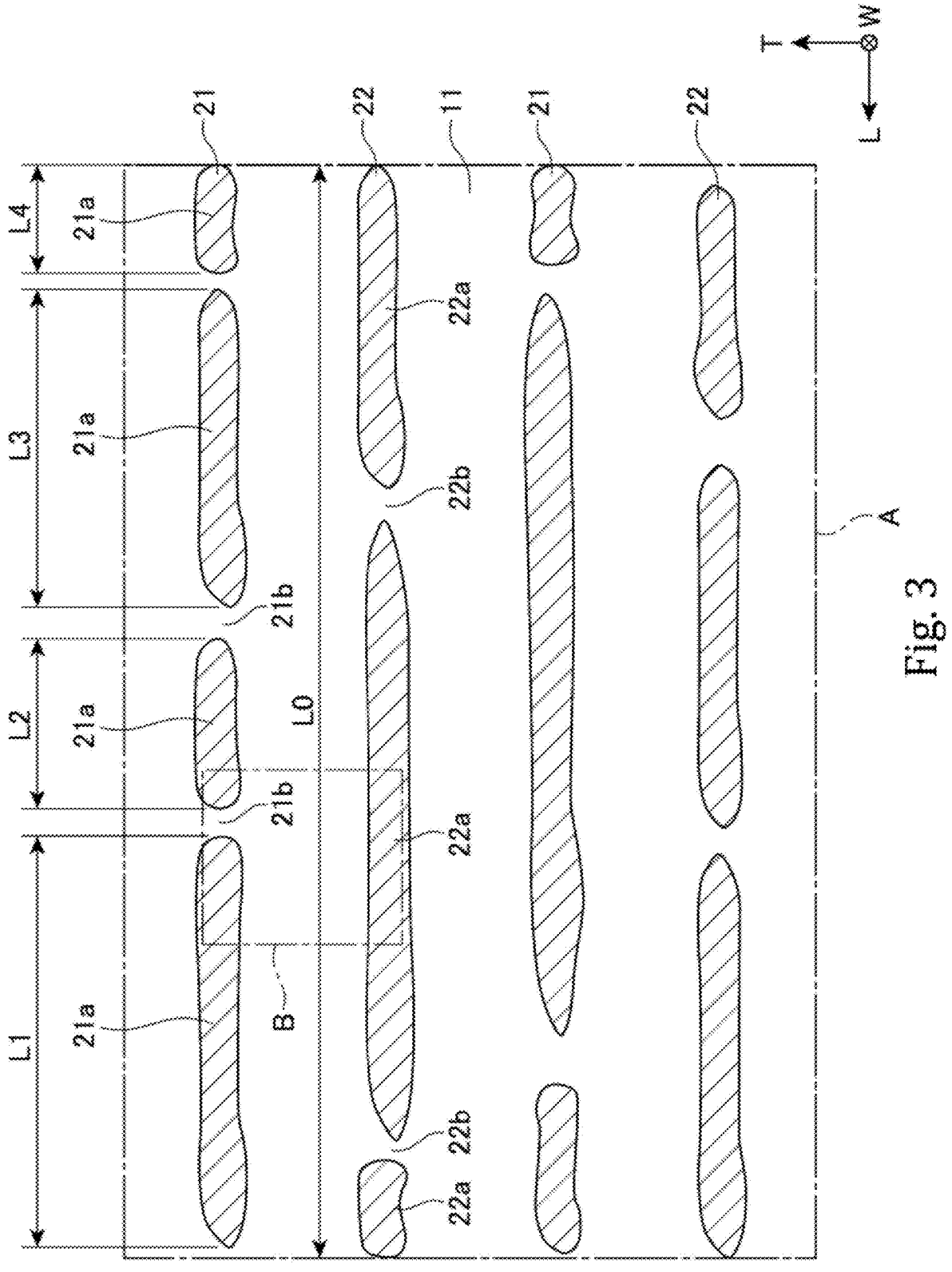
FIG. 3 is an enlarged sectional view showing, on an enlarged scale, a part (region A) of the section shown in FIG. 2.

The internal electrode layers will be further described with reference to FIG. 3. FIG. 3 is an enlarged cross-sectional view showing, on an enlarged scale, a region A of the cross-section of the body 10 shown in FIG. 2. The region A has a dimension L0 of about 50 μm in the L-axis direction. As shown in FIG. 3, each of the first internal electrode layers 21 includes a first electrode part 21a containing a main component metal element, and a plurality of first non-electrode parts 21b surrounded by the first electrode part 21a. The first electrode part 21a contains a sintered compact of the main component metal element. Therefore, the first electrode part 21a is highly conductive. As shown in FIG. 3, the first electrode part 21a of the first internal electrode layer 21 is observed in the cross-section cut along the lamination direction (the T-axis direction in FIG. 3) to be divided into multiple portions separated by the first non-electrode parts 21b.

The first non-electrode parts 21b are interposed between the first electrode parts 21a adjacent to each other in the L-axis direction and has a higher insulation quality than the first electrode parts 21a. As will be described later, the first non-electrode parts 21b contain a secondary phase formed by the solidification of a liquid-phase sintering agent that flowed to the regions between the first electrode parts 21a during the manufacturing process of the laminated ceramic capacitor 1. Therefore, the first non-electrode parts 21b contain the sintering agent element contained in the sintering agent. A portion of the first non-electrode parts 21b may be formed of oxides of the secondary element, a portion of the ceramic layer 11, and/or a void.

As will be described in detail later, the first internal electrode layer 21 is formed by firing an internal electrode pattern containing the main component metal element. As the sintering of the main component metal element progresses in this firing process, the shape of the sintered compact particles of the main component metal element approximates a sphere. In the firing process, as the shape of the sintered compact particles of the main component metal element approximates a sphere, voids are created between adjacent sintered compact particles of the main component metal element, allowing the liquid-phase sintering agent and other materials to penetrate into these voids.

In one aspect, the continuity of the internal electrode layers in the laminated ceramic capacitor 1 is preferably 75% or higher. The continuity of the first internal electrode layer 21 can be calculated as follows. First, the laminated ceramic capacitor 1 is polished so that an LT surface can be observed. Next, the region A included in this observation surface is observed under an SEM (scanning electron microscope), and regions that appear bright in this SEM image by contrast difference are identified as the first electrode parts 21a. The lengths of the first electrode parts 21a (the lengths along the L-axis direction in the example shown) are measured, and the measured lengths L1, L2, . . . , Ln are totaled. The total length of the first electrode parts 21a in the region A is divided by the length L0 of the measured region (i.e., (L1+L2+ . . . . Ln)/L0), and the resulting value can be defined as the continuity of one first internal electrode layer 21. The body 10 contains a plurality of first internal electrode layers 21, and the continuity can vary among the plurality of first internal electrode layers 21. Thus, ten different first internal electrode layers 21 can be selected, and the average of the continuities calculated for each of these selected first internal electrode layers 21 can be defined as the continuity of the first internal electrode layers 21 in the laminated ceramic capacitor 1.

As with the first internal electrode layers 21, each of the second internal electrode layers 22 can include a plurality of electrode parts containing the main component metal element, and non-electrode parts present between the electrode parts. Specifically, as shown in FIG. 3, each of the second internal electrode layers 22 includes a plurality of second electrode parts 22a containing a main component metal element, and second non-electrode parts 22b present between the second electrode parts 22a. The second non-electrode parts 22b contain a secondary phase formed by the solidification of a liquid-phase sintering agent that flowed to the regions between the second electrode parts 22a during the manufacturing process of the laminated ceramic capacitor 1. The continuity of the second internal electrode layers 22 is defined in the same way as the continuity of the first internal electrode layers 21. Further, the average of the continuity of the first internal electrode layers 21 and the continuity of the second internal electrode layers 22 can be defined as the continuity of the internal electrode layers in the laminated ceramic capacitor 1.

In the laminated ceramic capacitor 1, capacitance is generated in the regions where the first electrode parts 21a of the first internal electrode layers 21 and the second electrode parts 22a of the second internal electrode layers 22 are opposed to each other in the lamination direction, or the T-axis direction in the illustrated embodiment. Conversely, the first non-electrode parts 21b and the second non-electrode parts 22b do not generate capacitance. Therefore, in order to provide the laminated ceramic capacitor 1 with a high capacitance, the continuity of the internal electrode layers should desirably be higher. In one aspect, the continuity of the internal electrode layers is 75% or higher. This provides the laminated ceramic capacitor 1 with a high capacitance.

In the length direction of the cross-section of the internal electrode layers, or the L-axis direction in the illustrated embodiment, the first non-electrode parts 21b are interposed between the first electrode parts 21a that generate capacitance in the laminated ceramic capacitor 1. Similarly, in the length direction of the cross-section of the internal electrode layers, or the L-axis direction in the illustrated embodiment, the second non-electrode parts 22b are interposed between the second electrode parts 22a that generate capacitance in the laminated ceramic capacitor 1. Noting the arrangement of the first non-electrode parts 21b relative to the first electrode parts 21a and the arrangement of the second non-electrode parts 22b relative to the second electrode parts 22a as described above, the first non-electrode parts 21b and/or the second non-electrode parts 22b are herein referred to as the "regions between the internal electrodes."

(1-3) Ceramic Layers 11

(1-3-1) Composition of Ceramic Layers 11

The ceramic layers 11 contain as a main component thereof a crystal of ceramic material represented by the chemical formula $ABO_3$. In other words, the ceramic layers 11 contain as a main phase a crystal of the oxide represented by the chemical formula $ABO_3$. The oxide may have a perovskite structure. A component that is at least 50 wt % of the ceramic layers 11 with reference to the total mass of the ceramic layers 11 can be regarded as the main component of the ceramic layers 11. When the ceramic layers 11 contain 50 wt % or more the oxide represented by the chemical formula $ABO_3$, the ceramic layers 11 can be considered to contain the oxide represented by the chemical formula $ABO_3$ as the main component thereof. The ceramic layers 11 preferably contain at least 60 wt %, 70 wt %, 80 wt %, or 90 wt % the oxide represented by the chemical formula $ABO_3$.

In the chemical formula $ABO_3$, "A" is at least one element selected from the group consisting of Ba (barium), Sr (strontium), Ca (calcium), and Mg (magnesium). In the chemical formula $ABO_3$, "B" is at least one element selected from the group consisting of Ti (titanium), Zr (zirconium), and Hf (hafnium). When the oxide represented by the chemical formula $ABO_3$ has a perovskite structure, elements "A" and "B" are located at the A site and the B site of the perovskite structure, respectively. Examples of the oxides contained in the ceramic layers 11 as a main component include $BaTiO_3$ (barium titanate), $CaZrO_3$ (calcium zirconate), $CaTiO_3$ (calcium titanate), $SrTiO_3$ (strontium titanate), and $MgTiO_3$ (magnesium titanate).

The oxide contained in the ceramic layers 11 as the main component may be an oxide represented by the chemical formula $Ba_{1-x-y}Ca_xSr_yTi_{1-z}Zr_zO_3$ ($0 \leq x \leq 1$, $0 \leq y \leq 1$, $0 \leq z \leq 1$). Examples of this type of oxide include strontium barium titanate, calcium barium titanate, barium zirconate, barium zirconate titanate, calcium zirconate titanate, and calcium barium zirconate titanate.

The ceramic layers 11 may contain one or more additive elements in addition to the main component oxide. In one aspect, the one or more additive elements contained in the ceramic layers 11 are selected from the group consisting of Fe, Ni, Mo, Nb (niobium), Ta (tantalum), W, Mg, Mn (manganese), V (vanadium), and Cr. The ceramic layers 11 may contain two or more of the above additive elements.

The ceramic layers 11 may contain oxides of rare earth elements in addition to the main component oxide. The oxides of rare earth elements contained in the ceramic layers 11 may be oxides of at least one rare earth element selected from the group consisting of Y (yttrium), Sm (samarium), Eu (europium), Gd (gadolinium), Tb (terbium), Dy (dysprosium), Ho (holmium), Er (erbium), Tm (thulium), and Yb (ytterbium). The ceramic layers 11 may contain oxides of two or more rare earth elements.

The ceramic layers 11 may contain yet another type of oxide. The ceramic layer 11 may contain oxides of at least one element selected from the group consisting of, for example, Co, Ni (nickel), Na (sodium), and K (potassium). The ceramic layers 11 may contain oxides of two or more of these elements.

In one aspect, the thickness (the dimension in the T-axis direction) of the ceramic layers 11 is 0.2 to 10 μm.

(1-3-2) Crystal Grains

Figure 4:
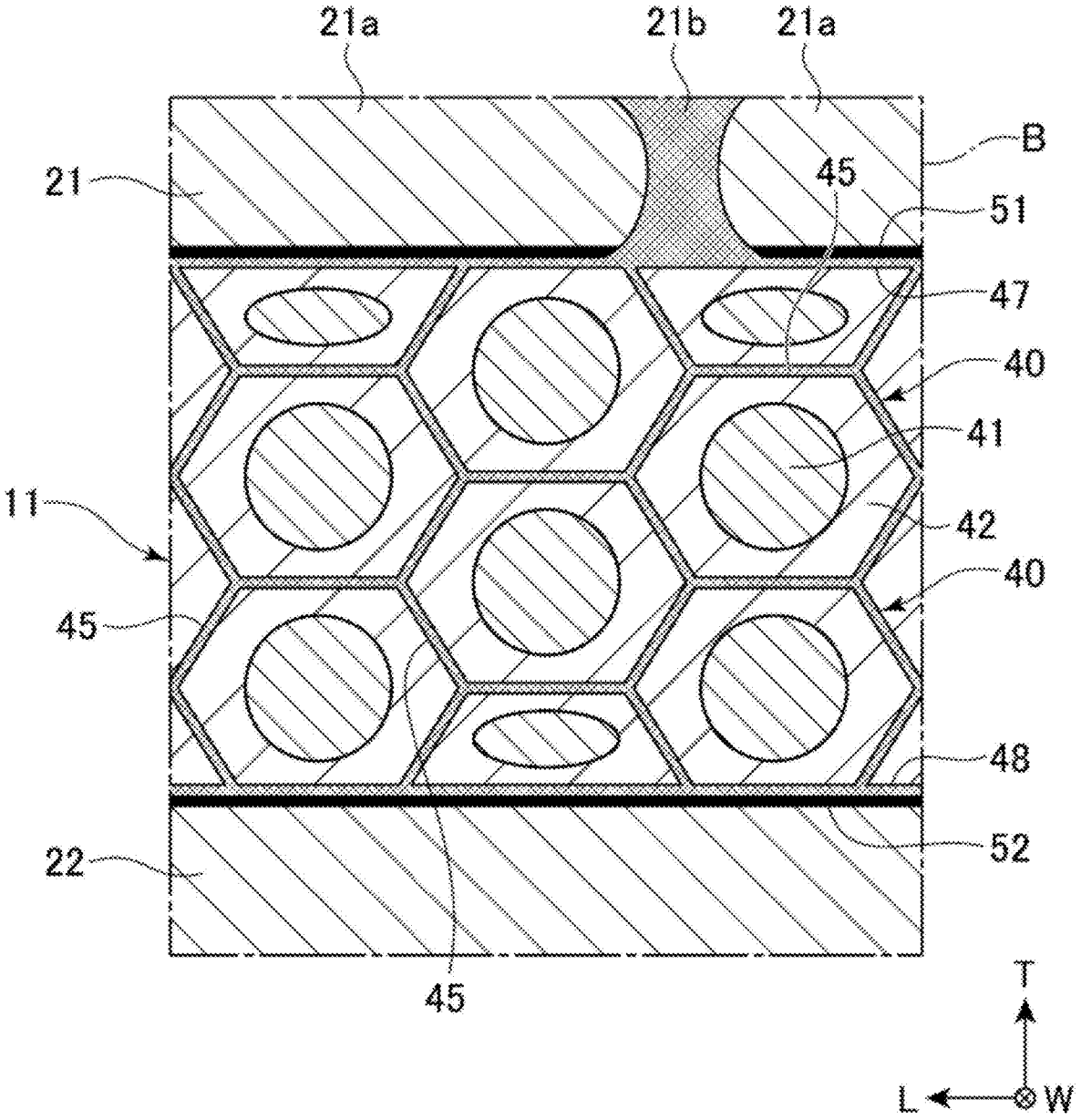
FIG. 4 is an enlarged sectional view showing, on an enlarged scale, a part (region B) of the section shown in FIG. 2.

The ceramic layers 11 contain a plurality of crystal grains of ceramic material (ceramic grains). In other words, the ceramic layer 11 is a polycrystalline body containing a plurality of crystal grains 40. At least a part of the plurality of crystal grains has a core-shell structure. With further reference to FIG. 4, a description will now be given of the crystal grains contained in the ceramic layers 11. FIG. 4 is an enlarged sectional view showing, on an enlarged scale, a region B of the section of the body 10 shown in FIG. 3, and FIG. 4 schematically shows a section of one of the crystal grains. The region B extends from the first internal electrode layer 21 through the ceramic layer 11 to the second internal electrode layer 22.

As shown in FIG. 4, the ceramic layer 11 contains a plurality of crystal grains 40.

In the illustrated embodiment, each of the crystal grains 40 has a core portion 41 and a shell portion 42. The elements (e.g., rare earth elements) added to the ceramic layer 11 are solid-solved more in the shell portion 42 than in the core portion 41. The core portion 41 and the shell portion 42 are identified by contrast differences in the mapping image obtained by STEM-EDS, for example. As described above, the additive elements contained in the ceramic layer 11 are solid-solved more in the shell portion 42 than in the core portion 41, and thus the region in the observation field where a large amount of these additive elements are detected can be identified as the shell portion 42.

Adjacent ones of the crystal grains 40 are separated from each other by grain boundaries 45. The ceramic layer 11 contains a plurality of crystal grains 40 with atoms regularly arranged, and grain boundaries 45 interposed between adjacent ones of the plurality of crystal grains 40. As shown, the number of crystal grains 40 interposed between a first internal electrode layer 21 and a second internal electrode layer 22 adjacent to the first internal electrode layer 21 may be three or less. A high capacitance can be obtained by reducing the number of crystal grains 40 interposed between the first internal electrode layer 21 and the second internal electrode layer 22. A first interface layer 47 is provided between the first internal electrode layer 21 and some of the plurality of crystal grains 40 adjacent to the first internal electrode layer 21. Also, a second interface layer 48 is provided between the second internal electrode layer 22 and some of the plurality of crystal grains 40 adjacent to the second internal electrode layer 22.

In the manufacture of the laminated ceramic capacitor 1, a sintering agent is added to the ceramic green sheet, which is the precursor of the ceramic layer 11, and a predetermined number of lamination units, each having the ceramic green sheet and an internal electrode pattern containing a main component metal element such as Ni formed on the surface of the ceramic green sheet, are stacked together to form a green laminate. This green laminate is fired to produce the laminated ceramic capacitor 1. Through firing of the green laminate, the ceramic green sheets form the ceramic layers 11, and the internal electrode patterns form the first internal electrode layers 21 and the second internal electrode layers 22. During firing, the sintering agent forms the liquid phase, and the elements of the raw powder contained in the ceramic green sheets are eluted into this liquid phase, and these eluted elements precipitate onto the crystal, thereby promoting the growth of crystal grains 40. In addition, the rearrangement of crystal grains 40 is promoted in the liquid phase, which densifies the ceramic layers 11. The sintering agent may be a low-melting glass. The low-melting glass used as the sintering agent may contain, for example, $SiO_2$, $B_2O_3$ and mixtures of these. Various low-melting glasses can be used as the sintering agent. Examples of low-melting glasses that can be used as the sintering agent include borosilicate glass and phosphate glass. Powder of $B_2O_3$ or $P_2O_5$ or a mixture of these powders may be used as the sintering agent. Elements other than oxygen contained in the sintering agent may be herein referred to as "sintering agent elements." For example, if a low-melting glass containing $SiO_2$ is used as the sintering agent, Si is the sintering agent element. Si, B, and P are examples of sintering agent elements.

Adding a sufficient amount of sintering agent to the ceramic green sheets promotes the sintering of the raw powder contained in the ceramic green sheets and the densification of the crystal grains 40, even when the ceramic green sheets are fired at a low temperature (e.g., at or below 1100° C.).

The grain boundaries 45, the first interface layer 47, and the second interface layer 48 contain a secondary phase formed by the solidification of the sintering agent having formed a liquid phase during firing, and oxides of elements in the main phase oxide (main component oxide) that constitute the ceramic layers 11. For example, if the main component oxide of the ceramic layers 11 is barium titanate, the grain boundaries 45, the first interface layer 47, and the second interface layer 48 contain the secondary phase, oxide of titanium ($TiO_2$), and oxide of barium (BaO).

(1-4) First Intermediate Layer 51 and Second Intermediate Layer 52

In the illustrated embodiment, the first intermediate layer 51 is provided between the ceramic layer 11 and the first internal electrode layer 21. Also, the second intermediate layer 52 is provided between the ceramic layer 11 and the second internal electrode layer 22. The first intermediate layer 51 contains the same secondary element as the first internal electrode layer 21. The second intermediate layer 52 contains the same secondary element as the second internal electrode layer 22. Specifically, the first intermediate layer 51 and the second intermediate layer 52 contain one or more than one element selected from the group consisting of As, Au, Co, Cr, Cu, Fe, In, Ir, Mg, Os, Pd, Pt, Re, Rh, Ru, Se, Sn, Ge, Te, W, Y, Ag, and Mo. The concentration of the secondary element in the first intermediate layer 51 is higher than that in the first internal electrode layer 21. In other words, in the first intermediate layer 51, the secondary element is concentrated. For example, the first intermediate layer 51 contains the secondary element at a concentration 1.2 or more times as high as that of the secondary element in the first internal electrode layer 21. Likewise, the concentration of the secondary element in the second intermediate layer 52 is higher than that in the second internal electrode layer 22. In other words, in the second intermediate layer 52, the secondary element is concentrated. For example, the second intermediate layer 52 contains the secondary element at a concentration 1.2 or more times as high as that of the secondary element in the second internal electrode layer 22.

The first intermediate layer 51, which contains the concentrated secondary element, allows for a higher Schottky barrier to be formed between the ceramic layer 11 and the first internal electrode layer 21. Likewise, the second intermediate layer 52, which contains the concentrated secondary element, allows for a higher Schottky barrier to be formed between the ceramic layer 11 and the second internal electrode layer 22. The higher Schottky barrier formed between the ceramic layer 11 and the first internal electrode layer 21 inhibits the occurrence of insulation degradation associated with the accumulation of oxygen defects near the first internal electrode layer 21 and/or the second internal electrode layer 22, and as a result, the insulation reliability of the laminated ceramic capacitor 1 can be enhanced. In other words, the service life of the laminated ceramic capacitor 1 can be extended.

The thickness (dimension in the T-axis direction) of the first intermediate layer 51 is, for example, 0.2 nm to 3.0 nm. The lower limit of the thickness of the first intermediate layer 51 may be 0.3 nm, 0.4 nm, or 0.5 nm. The upper limit of the thickness of the first intermediate layer 51 may be 2.0 nm, 1.5 nm, or 1.3 nm. The thickness of the second intermediate layer 52 may be about the same as the thickness of the first intermediate layer 51.

In the illustrated embodiment, the body 10 includes the first intermediate layer 51 and the second intermediate layer 52. This configuration allows the Schottky barrier to be increased in both the region between the ceramic layer 11 and the first internal electrode layer 21 and the region between the ceramic layer 11 and the second internal electrode layer 22. In one aspect, it is possible that the body 10 includes the first intermediate layer 51 but does not include the second intermediate layer 52. In this case, the Schottky barrier between the ceramic layer 11 and the first internal electrode layer 21 can be increased. In one aspect, it is possible that the body 10 includes the second intermediate layer 52 but does not include the first intermediate layer 51. In this case, the Schottky barrier between the ceramic layer 11 and the second internal electrode layer 22 can be increased.

According to the inventor's verification results, the first intermediate layer 51 and the second intermediate layer 52 have poor wettability with the liquid-phase sintering agent containing any one of Si, B, and P as a sintering agent element. Thus, the sintering agent having formed the liquid phase during the firing does not accumulate between the first interface layer 47, located between the ceramic layer 11 and the first internal electrode layer 21, and the second interface layer 48, located between the ceramic layer 11 and the second internal electrode layer 22, but is likely to be drained into the regions between the internal electrodes (that is, the non-electrode parts formed in the internal electrode layers (e.g., the first non-electrode parts 21, the second non-electrode parts 22b)). Thus, the presence of the intermediate layers on the internal electrode layers promotes the drain of the sintering agent from the ceramic green sheet to the regions between the internal electrodes.

The first intermediate layer 51 can be distinguished from the adjacent first internal electrode layer 21 and the ceramic layer 11 by observing the cross-section of the body 10 using HAADF-STEM (high-angle annular dark-field-scanning transmission electron microscopy). The first intermediate layer 51 is observed as a region of relatively high brightness between the ceramic layer 11 and the first internal electrode layer 21, which appears brighter than the ceramic layer 11. Similarly, the second intermediate layer 52 is observed as a region of relatively high brightness between the ceramic layer 11 and the second internal electrode layer 22.

The laminated ceramic capacitor 1 may be without either or both of the first and second intermediate layers 51 and 52. In some embodiments, the first and second intermediate layers 51 and 52 are not essential components, but the laminated ceramic capacitor 1 should preferably have the first and second intermediate layers 51 and 52 because they promote drain of the liquid-phase sintering agent from the ceramic layer 11 to the regions between the internal electrodes.

(1-5) First External Electrode 31 and Second External Electrode 32

In one aspect, the first and second external electrodes 31 and 32 are formed by applying a conductive paste to the body 10 and heating the conductive paste. The conductive paste can contain at least one substance from the group consisting of Ag, Pd, Au, Pt, Ni, Sn, Cu, W, Ti, and alloys of these.

(1-6) Concentration of Sintering Agent Element

Next, the concentration of the sintering agent element contained in the laminated ceramic capacitor 1 is described. As mentioned above, a sintering agent is added to the ceramic green sheet during the manufacture of the laminated ceramic capacitor 1. Since the sintering agent forms the liquid phase and flows within the laminate during sintering, the sintering agent elements are contained in different concentrations in each part of the laminated ceramic capacitor 1.

(1-6-1) First Concentration in Regions between Internal electrodes

First, the concentration of sintering agent element in the regions between the internal electrodes is described, taking the concentration of the sintering agent element in the first non-electrode parts 21b as an example. As described above, the first non-electrode parts 21b of the first internal electrode layer 21 contain a secondary phase formed by solidification of a liquid-phase sintering agent. The first non-electrode parts 21b contain the sintering agent element in a first concentration. In this specification, unless otherwise explained or unless the context requires otherwise, the first concentration of the sintering agent element refers to the atomic number ratio (at %) of the sintering agent element in the observation region within the first non-electrode parts 21b relative to the elements entering the B site of the main phase of the ceramic layer 11 (e.g., Ti element) taken at 100 at %. Therefore, the first concentration is expressed as the atomic number ratio of the sintering agent element to 100 at % of the B-site elements determined by quantifying the B-site elements and the sintering agent element in the observation region set in the first non-electrode parts 21b. For example, when barium titanate is used as the main component oxide of the ceramic layer 11 and a low-melting glass containing $SiO_2$ is used as the sintering agent, the atomic number ratio of Si element to 100 at % of Ti element contained in the first internal electrode layer 21 is taken as the first concentration representing the concentration of the sintering agent element in the first internal electrode layer 21.

The first non-electrode parts 21b may contain oxides of the secondary element as well as the secondary phase formed by solidification of the sintering agent. If Ba or Ti is eluted into the sintering agent drained into the first non-electrode parts 21b, oxides of Ba or Ti may also be present in the first non-electrode parts 21b. Therefore, the concentration of the sintering agent element in the first non-electrode parts 21b may vary depending on the location of the observation region. Therefore, instead of setting one observation region in one first non-electrode part 21b, ten observation regions should be set which are evenly distributed in a first non-electrode part 21b. The quantifying result of the sintering agent concentration can be leveled by taking the average of the concentration of the sintering agent element measured in each of these ten observation regions as the first concentration. When the first internal electrode layer 21 includes a plurality of first non-electrode parts 21b, the average of the first concentration of the sintering agent element measured in each of the plurality of first non-electrode parts 21b can be taken as the first concentration in the first non-electrode parts 21b of the first internal electrode layer 21.

(1-6-2) Second Concentration in First Interface Layer 47

During firing of the green laminate, the liquid-phase sintering agent also spreads to the interface between the internal electrode layer and the ceramic layer 11. The first interface layer 47 contains a secondary phase formed by solidification of the sintering agent having spread to the interface between the internal electrode layer and the ceramic layer 11. The first interface layer 47 contains the sintering agent element in a second concentration. The second concentration is expressed as the atomic number ratio of the sintering agent element to 100 at % of the B-site elements determined by quantifying the B-site elements and the sintering agent element in the observation region included in the first interface layer 47. Ten observation regions are set which are evenly distributed in the first interface layer 47 in the L-axis direction. The average of the concentration of the sintering agent element measured in each of these ten observation regions can be taken as the second concentration.

(1-6-3) Third Concentration in Grain Boundaries 45

In the ceramic layer 11, the grain boundaries 45 contain the secondary phase formed by solidification of the liquid-phase sintering agent. The grain boundaries 45 contains the sintering agent element in a third concentration. The third concentration is expressed as the atomic number ratio of the sintering agent element to 100 at % of the B-site elements determined by quantifying the B-site elements and the sintering agent element in the observation region included in the grain boundaries 45. Ten observation regions are set which are evenly distributed in the grain boundaries 45. The average of the concentration of the sintering agent element measured in each of these ten observation regions can be taken as the third concentration.

(1-6-4) Examples of Quantifying Methods of First to Third Concentrations

The concentrations (first to third concentrations) of the sintering agent element contained in the laminated ceramic capacitor 1 can be quantified by the following procedure.

First, a focused ion beam (FIB) system is used to take a sliced analysis sample with a thickness of about 30 to 80 nm from the laminated ceramic capacitor 1. The focused ion beam system may be, for example, the Helios G4UC from Thermo Fisher Scientific, Inc. The analysis sample is taken out of the laminated ceramic capacitor 1 using, for example, the lift-out method with the acceleration voltage of the focused ion beam system set at 5 to 30 kV.

The sliced analysis sample is then placed on a transmission electron microscope (TEM) equipped with an energy dispersive X-ray spectrometer (EDS), and the observation region is set in the observation surface of this analysis sample. The observation surface of the analysis sample may be a surface parallel to the cross section of the body 10 shown in FIG. 3 (LT plane). When observing the analysis sample, it is also possible that the laminated ceramic capacitor 1 is sliced along the WT plane to observe the surface parallel to the WT plane as the observation surface. The TEM may be the JEM-ARM200F NEOARM from JEOL Ltd.

When determining the first concentration, the observation region is set within the first non-electrode parts 21b in the observation surface. When determining the second concentration, the observation region is set to include the first interface layer 47. When determining the third concentration, the observation region is set in the grain boundaries 45. The observation region is, for example, a square region with sides of 15 to 50 nm. When determining the first concentration, the observation region is set such that the entire observation region is within the first non-electrode parts 21b. Since the entirety of the observation region set for the measurement of the first concentration is within the first non-electrode parts 21b, the average of the concentration values measured at each spot in the observation region can be taken as the first concentration. When determining the second concentration, the observation region is set such that the first interface layer 47 intersects two opposing sides of the four sides that define the outline of the rectangular observation region. Since the observation region set for the measurement of the second concentration includes regions other than the first interface layer 47 (e.g., the crystal grains 40 and the internal electrode layer), a scanning line is set along the first interface layer 47 that intersects the two opposing sides of the four sides that define the outline of the observation region, the measured concentration values are reconstructed along this scanning line, and the average of the concentration values reconstructed on this scanning line is taken as the second concentration. When determining the third concentration, the observation region is set to include a grain boundary 45 separating the adjacent crystal grains in the center of the observation region. The entirety of the observation region set for the measurement of the third concentration may be located in the grain boundary 45, depending on the size of the grain boundary 45. When the entirety of the observation region is located in the grain boundary 45, the average of the concentration values measured at each spot in the observation region can be taken as the third concentration. When the grain boundary 45 is small, the observation region may include regions other than the grain boundary 45 (e.g., the crystal grains 40). When the observation region includes regions other than the grain boundary 45, the average of the concentration values measured at each spot in the grain boundary 45 located near the center of the observation region can be taken as the third concentration.

Next, the STEM-EDS analysis is performed on this observation region to obtain mapping data for the quantitative elements contained in the analysis sample. The measurement by EDS can be performed with an acceleration voltage of 200 kV, a spot size of 6 c, a convergence aperture of 2-1, and a process time of T4. For quantitative evaluation of Ti, the intensity of the K-line of Ti can be used. For quantitative evaluation of sintering agent element (e.g., Si), the intensity of the K-line of the sintering agent element (e.g., Si) can be used. During the quantitative evaluation, the content of each element in the observation region can be calculated by applying corrections (e.g., Zaf correction) to the K-line spectrum of Ti and the K-line spectrum of the sintering agent element, taking into account atomic number effects, absorption effects, and fluorescence excitation effects. In the quantitative evaluation, the concentration of each element may be calculated by correcting the spectrum of each element using the proportionality factor (K factor) used in the Cliff-Lorimer method. In addition to the correction used in the Cliff-Lorimer method, a correction that takes into account the absorption effect of the sample may be performed to calculate the concentration of each element. The absorption effect of the sample can be determined by determining the thickness and density of the sample. The thickness of the sample can be determined, for example, by acquiring convergent-beam electron diffraction (CBED) diagrams under two-wave excitation conditions and analyzing the rocking curve observed on the diffraction disk. The density of the sample may be, for example, 6.02 g/cm³, the density of barium titanate. In the EDS measurement, the Ti K-line should be obtained with sufficient intensity, or for example, the intensity of the Ti K-line at the peak should be 10000 counts or more.

(1-6-5) Comparison of First, Second, and Third concentrations

In one aspect, the first concentration indicating the concentration of the sintering agent element in the first non-electrode parts 21b is higher than the second concentration indicating the concentration of the sintering agent element in the first interface layer 47. According to the inventor's verification, in conventional laminated ceramic capacitors that do not have a mechanism for promoting the drain of liquid-phase sintering agent from the ceramic layer to the internal electrode layer, the sintering agent tends to accumulate at the interface between the ceramic layer and the internal electrode layer during firing, and the sintering agent accumulated at this interface solidifies to form a low dielectric constant layer containing a high concentration of low dielectric constant sintering agent element between the ceramic layer and the internal electrode layer. The presence of the low dielectric constant layer formed at the interface between the ceramic layer and the internal electrode layer significantly reduces the capacitance of the laminated ceramic capacitor. By contrast, in the laminated ceramic capacitor 1 according to an embodiment of the invention, the first intermediate layer 51, which has poor wettability with the liquid-phase sintering agent, promotes the drain of the liquid-phase sintering agent into the first non-electrode parts 21b during firing, such that no low dielectric constant layer containing a high concentration of sintering agent element is formed between the ceramic layer 11 and the first inner electrode layer 21. In the laminated ceramic capacitor 1, the absence of the low dielectric constant layer containing a high concentration of sintering agent element between the ceramic layer 11 and the first internal electrode layer 21 can be confirmed by confirming that the second concentration indicating the concentration of the sintering agent element in the first interface layer 47 is lower than the first concentration indicating the concentration of the sintering agent element in the first non-electrode parts 21b.

In one aspect, the first concentration may be 10 at % or higher. Even when a sufficient amount of sintering agent is added to the ceramic green sheets for low temperature sintering (e.g., sintering at a densification temperature below 1050° C.), if the first concentration is 10 at % or higher, the sintering agent is sufficiently drained from the ceramic layer 11 to the regions between the internal electrode layers, and thus the ceramic layer 11 can be densified by low temperature sintering while inhibiting a decrease in capacitance of the laminated ceramic capacitor 1.

In one aspect, the second concentration may be 0.5 at % or lower. If the second concentration, which indicates the concentration of the sintering agent element in the first interface layer 47, is 0.5 at % or lower, no low dielectric constant layer that leads to a decrease in the capacitance of the laminated ceramic capacitor 1 is formed between the ceramic layer 11 and the first internal electrode layer 21. Since no low dielectric constant layer is formed at the interface between the ceramic layer 11 and the first internal electrode layer 21, the decrease in the capacitance of the laminated ceramic capacitor 1 can be inhibited.

In one aspect, the third concentration, which indicates the concentration of the sintering agent element in the grain boundary 45, is lower than the first concentration, which indicates the concentration of the sintering agent element in the first non-electrode parts 21b. With the third concentration lower than the first concentration, a smaller amount of sintering agent element remains in the ceramic layer 11 after the firing. This allows the ceramic layer 11 to be densified by the low-temperature sintering while inhibiting a decrease in the capacitance of the laminated ceramic capacitor 1.

In one aspect, the third concentration, which indicates the concentration of the sintering agent element in the grain boundary 45, is higher than the second concentration, which indicates the concentration of the sintering agent element in the first interface layer 47. In other words, the second concentration is lower than the third concentration. As described above, the presence of the low dielectric constant layer with a low dielectric constant formed between the ceramic layer and the internal electrode layer significantly reduces the capacitance of the laminated ceramic capacitor. With the second concentration lower than the third concentration, it is possible to inhibit the layered segregation of the sintering agent element with a low dielectric constant in the region between the ceramic layer 11 and the first internal electrode layer 21, thereby inhibiting a decrease in the capacitance of the laminated ceramic capacitor 1.

In one aspect, the third concentration may be 0.5 at % or lower. With the third concentration equal to or lower than 0.5 at %, a smaller amount of sintering agent element remains in the ceramic layer 11 after the firing. This allows the ceramic layer 11 to be densified by the low-temperature sintering while inhibiting a decrease in the capacitance of the laminated ceramic capacitor 1.

In this specification, the description regarding the first concentration indicating the concentration of the sintering agent element in the first non-electrode parts 21b of the first internal electrode layer 21 is also applicable to the concentration of the sintering agent element in the second non-electrode parts 22b of the second internal electrode layer 22, and the description regarding the second concentration indicating the concentration of the sintering agent element in the first interface layer 47 is also applicable to the concentration of the sintering agent element in the second interface layer 48. Further, in this specification, the description regarding the relationship between the first concentration and the second concentration is also applicable to the relationship between the concentration of the sintering agent element in the second non-electrode parts 22b of the second internal electrode layer 22 and the concentration of the sintering agent element in the second interface layer 48. For example, the concentration of the sintering agent element in the second non-electrode parts 22b of the second internal electrode layer 22 (corresponding to the first concentration) is higher than the concentration of the sintering agent element in the second interface layer 48 (corresponding to the second concentration). Thus, no low dielectric constant layer that leads to a decrease in the capacitance of the laminated ceramic capacitor 1 is formed between the ceramic layer 11 and the second internal electrode layer 22.

(2) Manufacturing Method of Laminated Ceramic Capacitor 1

Figure 5:
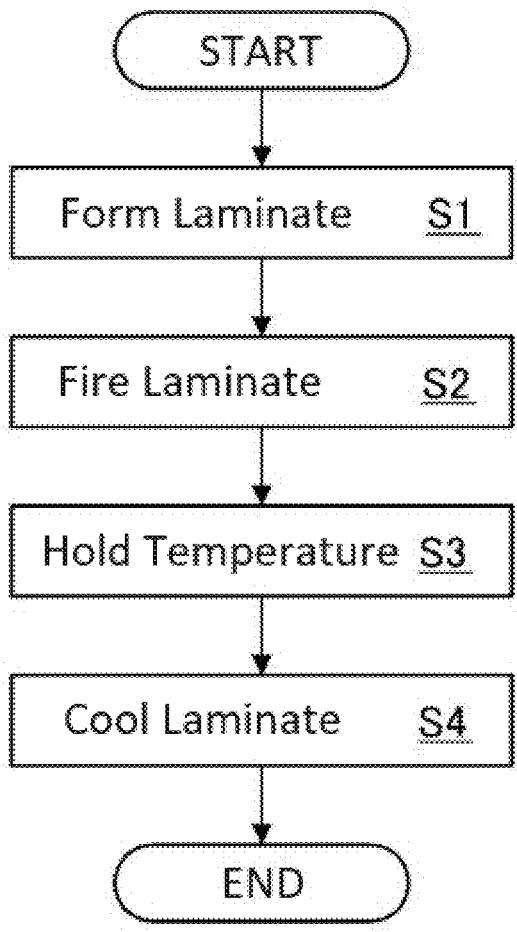
FIG. 5 is a flowchart showing a flow of a manufacturing method of a laminated ceramic capacitor according to one embodiment of the disclosure.

A description will now be given of one example of the manufacturing method of the laminated ceramic capacitor 1 with reference to FIGS. 5, 6A, and 6B. FIG. 5 is a flowchart showing a flow of a manufacturing method of the laminated ceramic capacitor according to one embodiment of the disclosure.

Here is a brief description of the manufacturing method shown in FIG. 5. In step S1, a green laminate as the precursor of the body 10 is formed. The green laminate includes ceramic green sheets, which are the precursor of the ceramic layers 11, and internal conductor patterns, which are the precursor of the first and second internal electrode layers 21 and 22. The green laminate may be formed by alternately stacking ceramic green sheets each having an internal conductor pattern on the surface thereof which is the precursor of the first internal electrode layer 21, and ceramic green sheets each having an internal conductor pattern on the surface thereof which is the precursor of the second internal electrode layer 22. The ceramic green sheets contain the sintering agent. The internal conductor patterns contain secondary elements such as Au, Fe, etc. in addition to the main component metal element. Next, in step S2, the green laminate formed in step S1 is heated in a firing furnace to fire the ceramic green sheets and the internal electrode patterns (first heat treatment), then in step S3, the laminate having undergone the firing is held at a predetermined keeping temperature for a predetermined time (second heat treatment), and finally in step S4, the inside of the firing furnace is cooled to obtain the laminated ceramic capacitor 1.

The following describes each of the steps shown in FIG. 5 in more detail. First, in step S1, ceramic powder is wet-mixed with a binder such as polyvinyl butyral (PVB) resin, an organic solvent such as ethanol or toluene, a plasticizer, and a sintering agent to obtain a slurry. The sintering agent may be, for example, a low-melting glass containing $SiO_2$, $B_2O_3$, and a mixture of these. Examples of low-melting glasses include borosilicate glass and phosphate glass. Powder of $B_2O_3$ or $P_2O_5$ may be used as the sintering agent. This slurry is coated on a substrate film using, for example, the die coater or doctor blade method, and then the slurry coated on the substrate film is dried, to obtain the ceramic green sheets. The ceramic green sheets are the precursor of the ceramic layers 11.

The ceramic powder used as the raw powder of the ceramic green sheets is, for example, barium titanate powder. Barium titanate powder is synthesized by reacting titanium raw material such as titanium dioxide with barium raw material such as barium carbonate by a known method such as the solid phase method, the sol-gel method, or the hydrothermal method.

Next, an internal electrode pattern is formed on each of the ceramic green sheets formed as described above. The internal electrode patterns are formed, for example, by printing a paste for the internal electrodes on the ceramic green sheets by screen printing or other known printing methods. When the internal electrode patterns are formed by screen printing, the paste for the internal electrodes is produced by kneading and mixing a metal powder, a binder resin, and a solvent by a three-roll mill. In other words, the paste for the internal electrodes is produced by dispersing a metal powder in a binder resin. The metal powder contained in the paste for the internal electrodes may be a mixed powder produced by mixing a powder of the main component metal element such as Ni, Cu, and Sn, which is the main component of the first internal electrode layers 21 and the second internal electrode layers 22, with a powder containing a secondary element. The mixed powder is produced by mixing the main component metal powder with the secondary element powder so that the content ratio of the secondary element to 100 at % of the main component metal element is in the range of 0.01 to 5 at %. When the laminated ceramic capacitor 1 includes none of the first intermediate layer 51 and the second intermediate layer 52, the secondary element powder is not necessarily added. The organic binder used in the paste for the internal electrodes may be a cellulose-based resin such as ethyl cellulose or an acrylic resin such as butyl methacrylate. The internal electrode patterns formed on some of the ceramic green sheets are the precursor of the first internal electrode layers 21, and the internal electrode patterns formed on the others of the ceramic green sheets are the precursor of the second internal electrode layers 22.

The internal electrode patterns may be formed on the ceramic green sheets by the sputtering method. The methods of forming the internal electrode patterns are not limited to those specified herein. The internal electrode patterns may be formed by various known methods, e.g., vacuum deposition, PLD (pulsed laser deposition), MO-CVD (metal organic chemical vapor deposition), MOD (metal organic decomposition), or CSD (chemical solution deposition).

As described above, a lamination unit having a ceramic green sheet and an internal electrode pattern formed on the surface of the ceramic green sheet is obtained. A predetermined number of lamination units are stacked together and thermo-compressed to form a green laminate. The top layer and the bottom layer of the green laminate may be formed of green sheets that do not have internal electrode patterns formed thereon.

Next, the green laminate is diced into pieces to obtain chip-like green laminates each being the precursor of the body 10. The chip-like green laminates may be subjected to a degreasing process. The degreasing process may be performed in an $N_2$ atmosphere. The green laminates having undergone the degreasing process may be coated with a metal paste by the dip method to form base electrode layers for the first and second external electrodes 31 and 32.

Figure 6A:
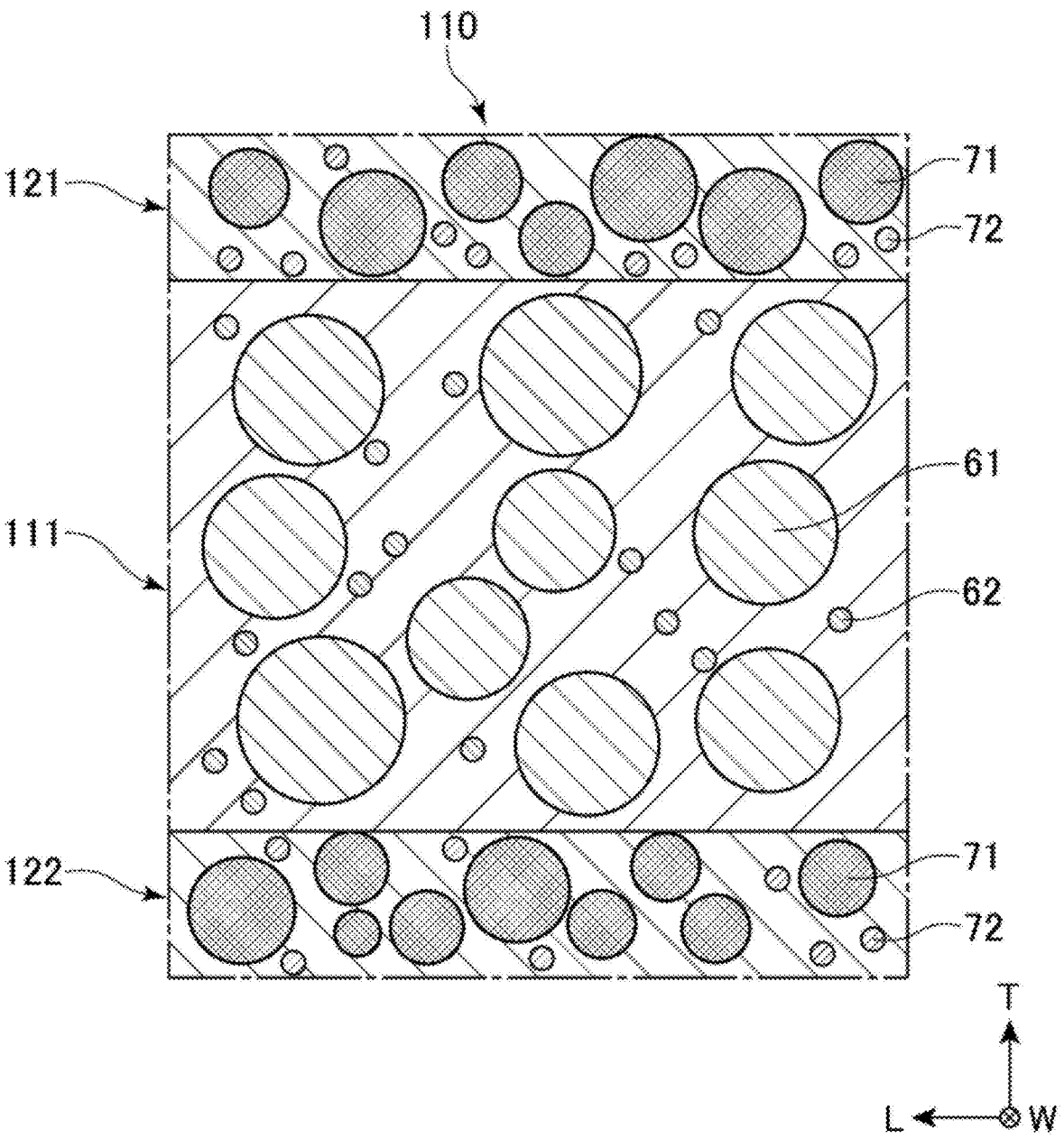
FIG. 6A is a schematic diagram illustrating a process of producing a composite ceramic capacitor.

FIG. 6A shows an enlarged schematic cross-sectional view of a chip-like green laminate cut along the lamination direction. As shown in FIG. 6A, in the green laminate 110, an internal electrode pattern 121, which is a precursor of the first internal electrode layer 21, is provided on one side of a ceramic green sheet 111 in the lamination direction, and an internal electrode pattern 122, which is a precursor of the second internal electrode layer 22, is provided on the other side of the ceramic green sheet 111 in the lamination direction. The ceramic green sheet 111 contains ceramic powder 61 and sintering agent powder 62. The ceramic powder 61 is, for example, barium titanate powder. The sintering agent powder 62 is, for example, a low-melting glass powder containing $SiO_2$. The internal electrode patterns 121 and 122 contain main component metal element powder 71 and secondary element powder 72. The main component metal element powder 71 is, for example, Ni powder. The secondary element powder 72 is, for example, Au powder. When the laminated ceramic capacitor 1 includes none of the first intermediate layer 51 and the second intermediate layer 52, the addition of the secondary element powder may be omitted.

Next, in step S2, the chip-like green laminate 110 produced in step S1 is placed into the firing furnace, and heat treatment (first heat treatment) is performed on the green laminate 110 in this furnace according to a predetermined temperature profile. The first heat treatment causes the ceramic green sheets 111 in the green laminate 110 to be fired to form the ceramic layers 11, the internal electrode patterns 121 to be fired to form the first internal electrode layers 21, and the internal electrode patterns 122 to be fired to form the second internal electrode layers 22.

An example of the temperature profile for the first heat treatment is now described. The temperature in the firing furnace is raised from the room temperature to an intermediate temperature at the rate of 200 to 300° C./h. The intermediate temperature is set at slightly lower than the sintering temperature of the main component metal element. When the main component metal element is Ni, the intermediate temperature is set at about 500 to 700° C. An example of the intermediate temperature is 600° C. The temperature is then increased at a fast rate from the intermediate temperature to the firing top temperature. The firing top temperature is, for example, 1000 to 1050° C. An example of the firing top temperature is 1040° C. The temperature increase rate is, for example, 20000 to 40000° C./h. An example of the temperature increase rate is 30000° C./h. The first holding time for the firing top temperature should be within ten seconds to prevent excessive sintering of the internal electrode layers. Cooling may start immediately after the firing top temperature is reached.

In the first heat treatment described above, the green laminate 110 is heated to the firing top temperature, whereby the green laminate 110 is fired to form the body 10. FIG. 6B shows an enlarged schematic cross-sectional view along the lamination direction of the body 10 obtained by heating the green laminate 110 to the firing top temperature and holding it at this firing top temperature for the predetermined first holding time. FIG. 6B shows the body 10 having undergone the firing top temperature and yet to be cooled.

Figure 6B:
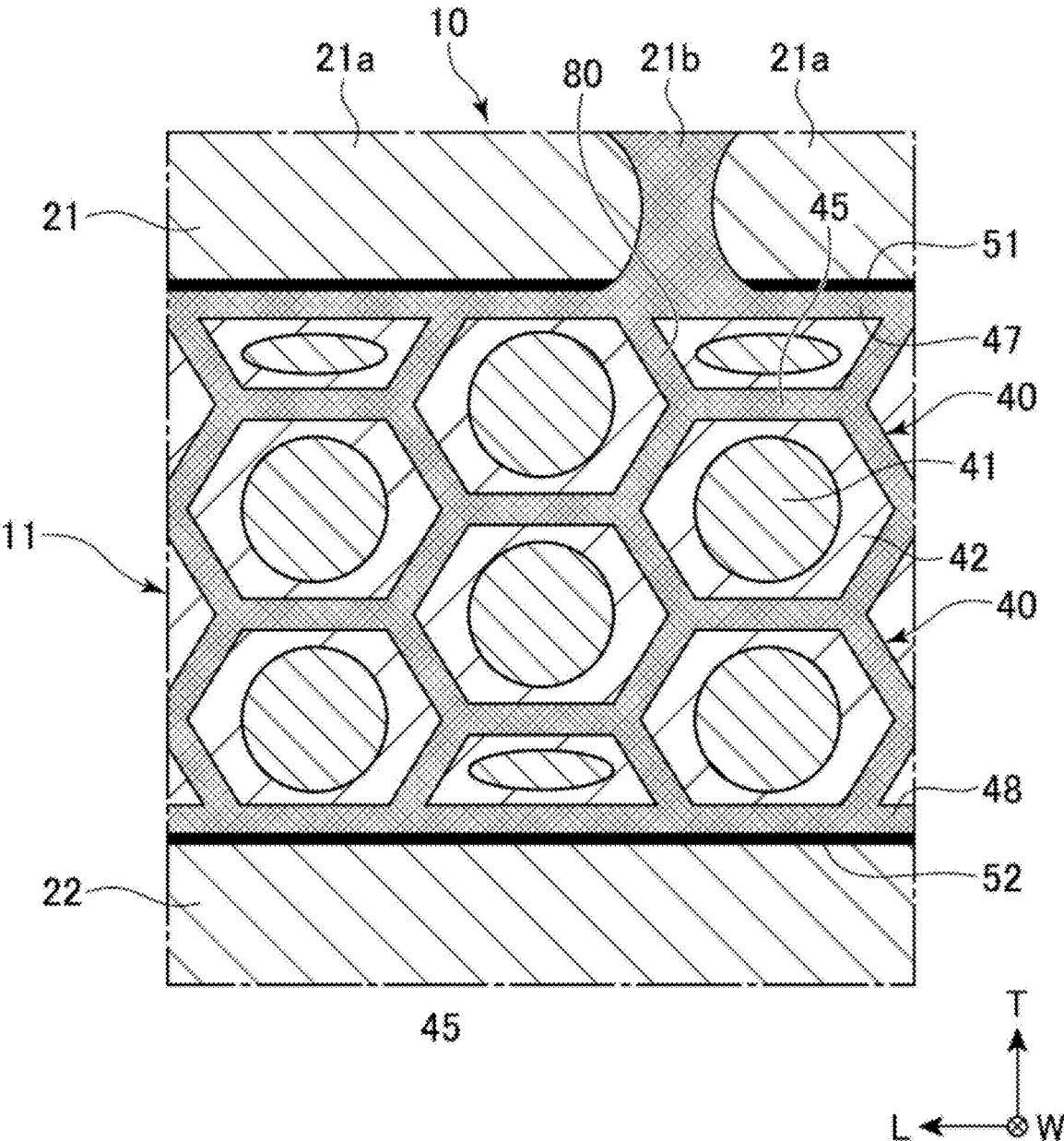
FIG. 6B is a schematic diagram illustrating a process of producing the composite ceramic capacitor.

In the body 10 shown in FIG. 6B, the ceramic powder 61 in the green laminate 110 is sintered through the first heat treatment in step S2 to form the crystal grains 40 each having the core portion 41 and the shell portion 42. When the ceramic powder 61 contains additive elements such as rare earth elements, the additive elements diffuse into the shell portion 42 during the first heat treatment. Therefore, the additive elements in the ceramic powder 61 are contained in higher concentrations in the shell portion 42 than in the core portion 41. In the ceramic layers 11, the crystal grains 40 are densely arranged. Adjacent ones of the crystal grains 40 are separated from each other by grain boundaries 45. During the firing process, the sintering agent powder 62 in the ceramic green sheets 111 is present in the form of a liquid-phase component 80. In FIG. 6B, the grain boundaries 45 are filled with the liquid-phase component 80.

In the first heat treatment in step S2, the main component metal element in the internal electrode patterns 121 and 122 is also sintered, and thus the first internal electrode layer 21 and the second internal electrode layer 22 contain sintered compact of the main component metal element. The main component metal element is partly formed into a spherical shape with the progress of the sintering, and the first internal electrode layer 21 and the second internal electrode layer 22 partly become discontinuous. In the illustrated embodiment, the spherical formation of a part of the main component metal element in the first internal electrode layer 21 has progressed, and thus the first non-electrode parts 21b containing no or little sintered compact of the main component metal element are formed between the first electrode parts 21a containing the sintered compact of the main component metal element. In the first heat treatment, in parallel with the sintering of the main component metal element, the secondary elements are thermally diffused toward the interfaces with the ceramic green sheet. Therefore, the first intermediate layer 51 containing the secondary elements in a higher concentration than the first internal electrode layer 21 is formed on the surface of the first internal electrode layer 21, and the second intermediate layer 52 containing the secondary elements in a higher concentration than the second internal electrode layer 22 is formed on the surface of the second internal electrode layer 22.

The liquid-phase component 80 formed by the melting of the sintering agent powder in the first heat treatment spreads to the surface of the ceramic powder 61 to promote the sintering of the ceramic powder 61. In the body 10, the liquid-phase component 80 spreads to the surfaces of the crystal grains formed by the sintering of the ceramic powder 61, so that the grain boundaries 45 in the body 10 are filled with the liquid-phase component 80, as shown in FIG. 6B. The elements contained in the ceramic powder 61 (Ba and Ti, if the ceramic powder is barium titanate powder) are eluted into the liquid-phase component 80. During the firing process, the crystal grains 40 grow as the elements eluted into the liquid-phase component 80 precipitate on the crystal surfaces. In addition, as the rearrangement of the crystal grains 40 in the liquid-phase component 80 progresses, the crystal grains 40 are densified.

The liquid-phase component 80 spreads from the grain boundaries 45 through the first interface layer 47 to the regions between the internal electrodes (in the example shown, the region within the first non-electrode part 21b of the first internal electrode layer 21). The first non-electrode parts 21b may be entirely filled with the liquid-phase component 80, or they may be partly filled with the liquid-phase component 80, as shown in FIG. 6B. When the second non-electrode parts 22b are formed in the second internal electrode layer 22, the liquid-phase component 80 may spread to the second non-electrode parts 22b through the second interface layer 48. Since the first and second intermediate layers 51 and 52 have poor wettability with the liquid-phase component 80, the liquid-phase component 80 does not accumulate in the first and second interface layers 47 and 48, but is drained into the first and second non-electrode parts 21b and 22b.

In the first heat treatment in step S2, the laminate is held at the firing top temperature for the first holding time (ten seconds in the above example), and then in the second heat treatment in step S3, the inside of the furnace is cooled to the keeping temperature, which is lower than the firing top temperature, and the laminate having undergone the firing is held at the keeping temperature for the second holding time. The keeping temperature is lower than the firing top temperature by 50 to 150° C. The keeping temperature may be lower than the firing top temperature by 100° C., for example. The second holding time may be longer than the first holding time. The second holding time may be one to three minutes. While the laminate is held at the keeping temperature, Ba and Ti contained in the liquid-phase component 80 in the grain boundaries 45 precipitate on the surfaces of the crystal grains 40, causing the crystal grains 40 to grow further. The growth of the crystal grains 40 causes the liquid-phase component 80 in the grain boundaries 45 to be pushed out of the grain boundaries 45 toward the first interface layer 47 and the second interface layer 48 and further drained from the first interface layer 47 and the second interface layer 48 into the first non-electrode parts 21b and the second non-electrode parts 22b. Therefore, in the second heat treatment in step S3, the main phase components (Ba and Ti) that have been eluted into the liquid-phase component 80 are precipitated, so that the content ratio of the sintering agent element in the liquid-phase component 80 increases relative to the main phase component elements, and the liquid-phase component 80 with the higher ratio of the sintering agent element flows into the first non-electrode parts 21b and the second non-electrode parts 22b. If a portion of the first non-electrode parts 21b of the first internal electrode layer 21 is a void at the start of step S3, the liquid-phase component 80 can be poured into this void while the body 10 is held at the keeping temperature in step S3. Thus, in the second heat treatment in step S3, the liquid-phase component 80 with a high content ratio of the sintering agent element can be drained out of the ceramic layer 11, so that the sintering agent element with a low dielectric constant contained in the ceramic layer 11 can be efficiently drained, thereby improving the capacitance of the laminated ceramic capacitor 1.

Next, in step S3, the laminate is held at the keeping temperature for the second holding time, and then in step S4, the firing furnace is cooled to the room temperature to obtain the laminated ceramic capacitor 1. The cooling in step S4 causes the liquid-phase component 80 in the body 10 to solidify to form a secondary phase. The secondary phase contains the sintering agent element. As the liquid-phase component 80 is cooled, the elements of the main phase components (e.g., Ba and Ti) that have been eluted into the liquid-phase component 80 precipitate in the form of oxides (such as BaO and $TiO_2$) for example, in the regions between the internal electrodes, the first interface layer 47, the second interface layer 48, and the grain boundaries 45.

Processes not shown in the flowchart of FIG. 5 may be performed to produce the laminated ceramic capacitor 1. For example, the laminated ceramic capacitor 1 obtained through the second heat treatment in step S2 may be subjected to re-oxidation treatment at 600° C. to 1000° C. in an $N_2$ gas atmosphere. A plating layer of Cu, Ni, Sn, etc. may be provided on the surfaces of the first and second external electrodes 31 and 32. This plating layer can be formed by the electrolytic or electroless plating method.

A part of the steps shown in the flowchart of FIG. 5 may be omitted to produce the laminated ceramic capacitor 1. For example, the second heat treatment in step S3 may be omitted. Even if the second heat treatment in step S3 is omitted, the liquid-phase component 80 can be drained into the first non-electrode parts 21b and the second non-electrode parts 22b, and thus the additional draining of the liquid-phase component 80 in the second heat treatment is not essential for producing the laminated ceramic capacitor 1. However, if the laminated ceramic capacitor 1 does not include the first intermediate layer 51 and the second intermediate layer 52 (i.e., if the internal electrode patterns 121 and 122 do not contain any secondary element powder in the above manufacturing method), the second heat treatment is performed to promote the draining of the liquid-phase component 80 into the first non-electrode parts 21b and the second non-electrode parts 22b.

(3) Examples

The invention will now be further described in detail based on examples. The invention is not limited to the following examples.

(3-1) Preparation of Samples

First, 15 different samples were prepared according to the manufacturing method shown in FIG. 5, as follows. Specifically, a slurry was first obtained by wet-mixing barium titanate powder with polyvinyl butyral (PVB) resin, a solvent, a plasticizer, and a low-melting glass powder containing $SiO_2$ as a sintering agent. The low-melting glass powder containing $SiO_2$ was added in 5 at % relative to 100 at % of Ti contained in the barium titanate powder. The slurry was coated on a substrate film, and then the slurry coated on the substrate film was dried to obtain the ceramic green sheets. Next, mixed powders were prepared by mixing Ni powder, which is the main component metal element, with the secondary element powders containing the secondary elements listed in Table 1. In sample 1, no secondary element was mixed. In sample 7, a mixture of Au powder and Fe powder was used as the secondary element powder. Each of the secondary element powders was weighed so that the ratio of the secondary element to 100 at % of Ni was the amount listed under "Amount of Secondary Element Added" in Table 1, and the weighed secondary element powder was mixed with the Ni powder. Next, the mixed powder was wet-mixed with polyvinyl butyral (PVB) resin, a solvent, and a plasticizer to obtain a slurry for the internal electrodes. Then, the slurry for the internal electrodes was printed on a part of the surfaces of the ceramic green sheets to form an internal electrode pattern on each of the ceramic green sheets, thus forming a lamination unit. This lamination unit has the ceramic green sheet and the internal electrode pattern formed on the surface of the ceramic green sheet.

TABLE 1

| Sample No. | Secondary Element | Amount of Secondary Element Added [at %] | Temperature Holding Step |
|---|---|---|---|
| 1* | N/A | N/A | No |
| 2 | Au | 0.3 | No |
| 3 | Au | 0.3 | Yes |
| 4 | Fe | 0.3 | Yes |
| 5 | In | 0.3 | Yes |
| 6 | Cr | 0.3 | Yes |
| 7 | Au/Fe | 0.3/0.3 | Yes |
| 8 | Au | 0.05 | No |
| 9 | Au | 0.01 | No |
| 10 | Fe | 0.05 | No |
| 11 | Fe | 0.1 | No |
| 12 | Fe | 1 | No |
| 13 | Fe | 3 | No |
| 14 | Fe | 5 | No |
| 15* | Fe | 5.5 | No |

As shown in Table 1, the secondary element in samples 2 and 3 is Au, while the secondary element in sample 4 and samples 10 to 15 is Fe. The secondary elements in the other samples are also listed in Table 1.

Next, 500 lamination units were stacked together to form a laminate, which was then diced into chip-like green laminates. The chip-like green laminates had the 1005 shape (with a length 1.0 mm, a width 0.5 mm, and a height 0.5 mm). Next, the chip laminates were degreased in an $N_2$ atmosphere. Next, the base layers of the external electrodes were formed on each of the chip laminates by applying metal paste to the degreased compact by the dip method.

Next, the chip laminates obtained as described above, which were the precursor of the samples, were put into the firing furnace, and the chip laminates were subjected to the first heat treatment according to a predetermined temperature profile and under predetermined firing conditions. Specifically, the inside of the firing furnace was maintained at a low oxygen atmosphere with an oxygen partial pressure of $7.8 \times 10^{-8}$ atm, the temperature inside the firing furnace was increased from room temperature to 600° C. at a rate of 300° C./h and then increased from 600° C. to 1040° C. at a rate of 30000° C./h, and the firing top temperature of 1040° C. was held for ten seconds.

After holding the firing top temperature for ten seconds, cooling in the firing furnace was started. In preparing samples 3 to 7, the temperature in the firing furnace was held at 940° C. (the keeping temperature), which is 100° C. lower than the firing top temperature, for two minutes after the start of cooling (i.e., the second heat treatment was performed), and after holding the keeping temperature, the samples were cooled to room temperature. For samples 1 to 2 and 8 to 15, after holding the firing top temperature for ten seconds, cooling to the room temperature was performed without holding the keeping temperature.

Samples 1 to 15 of the laminated ceramic capacitor were prepared in the above manner. In samples 1 to 15, the ceramic green sheets were fired to form the ceramic layers, and the internal electrode patterns were fired to form the internal electrode layers.

Samples 1 to 15 were encapsulated in a resin, and each sample encapsulated in the resin was polished along a plane parallel to the lamination direction (e.g., the LT plane in FIG. 2) to expose a cross-section parallel to the lamination direction, and this exposed cross-section was observed using a field emission scanning secondary electron microscope (FE-SEM) at a magnification of 20,000. This observation confirmed that the crystal grains were densified in all the samples. Thus, each sample was sintered at a low densification temperature of 1040° C.

(3-2) Determination of Concentration of Sintering Agent Element

Next, each of samples 1 to 15 was sliced using a focused ion beam (FIB) system so that the LT surface (FIG. 2) can be the observation surface, and a sliced analysis sample with a thickness of 60 nm was taken from each of samples 1 to 15 using the lift-out method. The focused ion beam system used was the Helios G4UC from Thermo Fisher Scientific, Inc. Damage that appeared on the observation surfaces of the sliced samples was removed as appropriate by Ar ion milling.

Next, each of the sliced samples was placed in a TEM equipped with an EDS detector, and a STEM image was acquired on the observation surface of the sliced sample. The contrast difference in the STEM image was used to identify the non-electrode parts (corresponding to the first non-electrode parts 21b) in the internal electrode layer, the interface layer (corresponding to the first interface layer 47) between the ceramic layer and the internal electrode layer, and the grain boundaries (corresponding to the grain boundaries 45) between the crystal grains in the ceramic layer. The TEM used was the JEM-ARM200F NEOARM from JEOL Ltd. The EDS detector used was the Dry SD 100 GV detector from JEOL Ltd.

First, for each sample, ten observation regions of 30 nm square were set in the non-electrode parts in the internal electrode layer (e.g., the regions corresponding to the first non-electrode parts 21b), and the concentrations of Ti element and Si element (sintering agent element) were measured in each of these ten observation regions by EDS. The measurement by EDS was performed with an acceleration voltage of 200 kV, a spot size of 6 c, a convergence aperture of 2-1, and a process time of T4. The same measurement conditions were used for EDS measurements in other observation regions described below. For the quantitative evaluation, the concentration of each element was calculated by applying the Zaf correction to the K-line spectra of Ti and Si. For each of these ten observation regions, the concentration of Si (at %) relative to 100 at % concentration of Ti was calculated based on the concentration of each element obtained by EDS measurement, and the average of the Si concentration in these ten observation regions is shown in Table 2 below, in the column of "Regions between Internal Electrodes (a: first concentration)" under "Sintering Agent Element Concentration." In calculating the first concentration, each element concentration used was the average of the concentrations measured at different spots in the observation regions.

Next, for each sample, ten observation regions of 30 nm square were set in the interface layer (e.g., the region corresponding to the first interface layer 47) between the ceramic layer and the internal electrode layer, and the concentrations of Ti element and Si element (sintering agent element) were measured in each of these ten observation regions by EDS. For each of these ten observation regions, a scanning line was set along the first interface layer 47 that intersects the opposing two of the four sides defining the outline of the observation region, the concentration measurements were reconstructed along the scanning line, the concentration of Si (at %) relative to 100 at % concentration of Ti was calculated based on the concentration of each element obtained by averaging the EDS measurements reconstructed on the scanning line, and the average of the Si concentration in these ten observation regions is shown in Table 2 below, in the column of "Interface Layer (b: second concentration)" under "Sintering Agent Element Concentration."

Next, for each sample, ten observation regions of 30 nm square were set in the grain boundaries (e.g., the regions corresponding to the grain boundaries 45) between the crystal grains in the ceramic layer, and the concentrations of Ti element and Si element (sintering agent element) were measured in each of these ten observation regions by EDS. For each of these ten observation regions, the concentration of Si (at %) relative to 100 at % concentration of Ti was calculated based on the concentration of each element obtained by EDS measurement, and the average of the Si concentration in these ten observation regions is shown in Table 2 below, in the column of "Grain Boundaries (c: third concentration)" under "Sintering Agent Element Concentration." Since the entire observation regions were in the grain boundaries 45, in calculating the third concentration, each element concentration used was the average of the concentrations measured at different spots in the observation regions.

In Table 2, the "a/c" column shows the ratio of the first concentration to the third concentration, and the "c/b" column shows the ratio of the third concentration to the second concentration.

(3-3) Confirmation of Intermediate Layer

Next, in the above analysis sample, ten observation regions of 15 nm square extending from the internal electrode layer to the ceramic layer were set, and in each of these ten observation regions, TEM-EDS analysis was performed under the following conditions: acceleration voltage of 200 kV, electron beam diameter of 1.5 nm, and measurement time of two hours. Specifically, a concentration map representing the concentrations of the quantitative elements (Ba, Ti, O, Ni, and a secondary element (Au for sample 2)) in atomic number ratio (at %) was obtained for each of the observation regions, and this concentration map was reconstructed along a scanning line set to extend along the T-axis from the internal electrode layer to the ceramic layer in each of the observation regions, thereby obtaining a line profile of each quantitative element for each observation region. In the line profiles of samples 2 to 15, the peak of the secondary element appeared near the intersection of the profiles of Ba and Ni. In the line profile of sample 1, no peak was found for the element corresponding to the secondary element. The results of the line analysis confirmed that for samples 2 to 15, the first intermediate layer 51 containing the secondary element in a higher concentration than the first internal electrode layer 21 was formed between the ceramic layer 11 and the first internal electrode layer 21.

(3-4) Capacitance

The capacitance was measured for each of samples 1 to 14. The capacitance was measured using an LCR meter at room temperature, with a measurement voltage of 0.5 V and a frequency of 1 kHz. One hundred samples were selected for each of samples 1 to 14, and the capacitance was determined for each of these 100 samples. The average of the capacitances measured for the 100 samples was calculated for each of samples 1 to 14, and this calculated average was used as the capacitance of the sample. The capacitance calculated in this way is listed in the column of "Capacitance" in Table 2. The column of "Capacitance Ratio" in Table 2 shows in percentage the relative capacitance of each sample relative to the capacitance of sample 1, which has no secondary element added. For example, a capacitance ratio of "137%" for sample 2 indicates that the capacitance calculated for sample 2 is 137% of that of sample 1. For sample 15, the capacitance could not be measured due to a short circuit between the internal electrodes. Sample 15 has 5.5 at % Fe added as a secondary element, and it is presumed that the large amount of Fe diffusing into the ceramic layer, 11 caused abnormal grain growth in the ceramic layer, resulting in a short circuit between the internal electrodes.

TABLE 2

| | Sintering Agent Element Concentration [at %] | | | | | | |
|---|---|---|---|---|---|---|---|
| Sample No. | Regions between Internal Electrodes (a: First Concentration) | Interface Layer (b: Second Concentration) | Grain Boundaries (c: Third Concentration) | a/c | c/b | Capacitance [μF] | Capacitance Ratio |
| 1* | 3.2 | 3.3 | 3.3 | 0.97 | 1.0 | 7.5 | 100% |
| 2 | 16.0 | 0.5 | 0.5 | 30 | 1.0 | 10.3 | 137% |
| 3 | 25.0 | 0.2 | 0.3 | 83 | 1.5 | 11.3 | 151% |
| 4 | 22.0 | 0.3 | 0.4 | 55 | 1.3 | 11 | 147% |
| 5 | 23.0 | 0.3 | 0.4 | 58 | 1.3 | 11.1 | 148% |
| 6 | 21.0 | 0.2 | 0.3 | 70 | 1.5 | 10.9 | 145% |
| 7 | 24.0 | 0.2 | 0.3 | 80 | 1.5 | 11.1 | 148% |
| 8 | 10.2 | 0.8 | 0.9 | 11 | 1.1 | 9.9 | 132% |
| 9 | 8.0 | 1.3 | 1.3 | 6.2 | 1.0 | 8.3 | 111% |
| 10 | 9.0 | 1 | 1.0 | 9.0 | 1.0 | 8.9 | 119% |
| 11 | 9.5 | 0.9 | 0.9 | 10.6 | 1.0 | 9.1 | 121% |
| 12 | 12.0 | 0.5 | 0.6 | 20.0 | 1.2 | 10 | 133% |
| 13 | 12.8 | 0.4 | 0.6 | 21.3 | 1.5 | 10.6 | 141% |
| 14 | 13.3 | 0.3 | 0.4 | 33.3 | 1.3 | 11.3 | 151% |
| 15* | 14.0 | 0.6 | 0.6 | 23 | 1.0 | N/A(Short) | N/A |

In Table 2, the samples not encompassed by the present invention (i.e., comparative examples) have an asterisk (*) added to the sample number. Specifically, samples 1 and 15 are comparative examples not encompassed by the present invention.

In preparing sample 1, no secondary element is added to the internal electrode patterns. Thus, no layer corresponding to the first or second intermediate layer 51 or 52 is formed on the surfaces of the internal electrode layers of sample 1. Also, in the process of preparing sample 1, the temperature was not held at the keeping temperature after the sintering top temperature was reached. Thus, the drain of the liquid-phase sintering agent from the ceramic layer 11 to the first non-electrode parts 21*b* of the first internal electrode layer 21 was not promoted. Therefore, in sample 1, it is presumed that the liquid-phase sintering agent was not sufficiently drained to the regions between the internal electrodes (the regions corresponding to the first non-electrode parts 21*b*). In sample 1, the first concentration is slightly lower than the second and third concentrations, confirming that not a large amount of sintering agent was drained to the regions between the internal electrodes.

In each of samples 2-14, the first concentration, which indicates the concentration of the sintering agent element in the regions between the internal electrodes, is larger than both the second and third concentrations, which indicate the concentrations of the sintering agent element within the ceramic layer 11. This indicates that a larger amount of sintering agent was drained from the ceramic layer 11 to the regions between the internal electrodes than in sample 1. The capacitances of samples 2 to 14 are more than 10% higher than that of sample 1. This improvement in capacitance is considered to result from the reduced content of the sintering agent element with a low dielectric constant in the ceramic layer 11, which was caused by the promoted drain of the sintering agent from the ceramic layer 11 into the regions between the internal electrodes.

The sintering agent element with a low specific permeability distributed in layers at the interface between the ceramic layer and the internal electrode layers significantly reduces the capacitance of the laminated ceramic capacitor. Therefore, it is considered that the capacitance of the laminated ceramic capacitor can be improved by promoting drain of the sintering agent from the interfaces between the ceramic layer and the internal electrode layers (the regions corresponding to the first interface layer 47 and the second interface layer 48) to the regions between the internal electrodes. In Table 2, for samples 2 to 8 and 11 to 14, the ratio of the first concentration to the third concentration (a/c) is greater than 10, indicating a low content of the sintering agent element at the interfaces between the ceramic layer and the internal electrode layers. In addition, for samples 2 to 8 and 11 to 14, the capacitance is improved by more than 30% compared to sample 1. The high improvement of capacitance in samples 2 to 8 and 11 to 14 is considered to result from the drain of liquid-phase sintering agent from the interfaces between the ceramic layer and the internal electrode layers to the regions between the internal electrodes to the extent that the ratio (a/c) of the first concentration (a) to the third concentration (c) is greater than 10.

In samples 3 to 7, which underwent the temperature holding step in production, the ratio of the first concentration to the third concentration is greater than 30, and the capacitance is improved by 37% or more compared to sample 1. This remarkable improvement in capacitance is considered to result from the drain of the liquid-phase components having an increased content ratio of the sintering agent element to the regions between the internal electrodes, the content ratio being increased by further growth of the crystal grains in the ceramic layer during the temperature holding step. Thus, the reduction of the capacitance due to the sintering agent can be further inhibited by performing, after the sintering top temperature is reached, a temperature holding step in which the laminate is held at the keeping temperature, which is lower than the sintering top temperature but can promote the growth of the crystal grains 40.

From samples 10 to 14, it can be seen that the capacitance improves significantly with the increased content ratio of Fe as a secondary element contained in the internal electrode patterns. When the content ratio of Fe was high, layers (the first and second intermediate layers 51 and 52) having a poor wettability with the liquid-phase sintering agent were formed on the surfaces of the internal electrode layers, and the presence of these layers having a high content ratio of the secondary element and a poor wettability with the sintering agent promoted the drain of the sintering agent from the interfaces between the ceramic layer and the internal electrode layers to the regions between the internal electrode layers. Thus, the reduction of the capacitance due to the sintering agent can be further inhibited by increasing the amount of the secondary element to the extent that the insulation properties of the ceramic layer 11 can be maintained. The upper limit of the amount of the secondary element added can be 5 at % relative to 100 at % of the main component metal element.

Although experimental results are not described herein, it was found that in addition to Au, Fe, In, and Cr, which were added as a secondary element to the main component metal element in samples 2 to 14, use of As, Co, Cu, Ir, Mg, Os, Pd, Pt, Re, Rh, Ru, Se, Sn, Ge, Te, W, Y, Ag, and Mo as a secondary element is also possible to form intermediate layers that promote the drain of liquid-phase sintering agent, as in samples 2 to 14 listed in Table 2.

Experimental results showing the same tendency as in Table 2 were obtained when $B_2O_3$ was substituted for $SiO_2$ in the low-melting glass used as a sintering agent.

(4) Notes

The dimensions, materials, and arrangements of the constituent elements described for the above various embodiments are not limited to those explicitly described for the embodiments, and these constituent elements can be modified to have any dimensions, materials, and arrangements within the scope of the present invention.

Constituent elements not explicitly described herein can also be added to the above-described embodiments, and it is also possible to omit some of the constituent elements described for the embodiments.

The words "first," "second," "third" and so on used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituent elements from performing the functions of the constituent elements identified by other numbers.

The expression of "including" a constituent element used herein does not exclude other constituent elements but rather means that other constituent elements can be further included, as long as they are consistent with the invention.

(5) Additional Embodiments

Embodiments disclosed herein also include the following.

Additional Embodiment 1

A laminated ceramic capacitor, comprising:
a body having a first internal electrode layer, a second internal electrode layer, and a ceramic layer disposed between the first internal electrode layer and the second internal electrode layer, the ceramic layer being formed of ceramic material containing a sintering agent composed mainly of a sintering agent element;

a first external electrode provided on the body so as to be electrically connected to the first internal electrode layer; and
a second external electrode provided on the body so as to be electrically connected to the second internal electrode layer,
wherein the first internal electrode layer includes an electrode part and a non-electrode part, the electrode part being formed of a sintered compact of a main component metal element, the non-electrode part being surrounded by the electrode part and containing the sintering agent element, and
wherein a first concentration indicating a concentration of the sintering agent element in the non-electrode part is higher than a second concentration indicating a concentration of the sintering agent element in an interface between the first internal electrode layer and the ceramic layer.

Additional Embodiment 2

The laminated ceramic capacitor of Additional Embodiment 1,
wherein the ceramic layer contains a plurality of crystal grains each formed of a sintered compact of the ceramic material, and
wherein the first concentration is higher than a third concentration indicating a concentration of the sintering agent element in grain boundaries of the crystal grains.

Additional Embodiment 3

The laminated ceramic capacitor of Additional Embodiment 2, wherein the third concentration is higher than the second concentration.

Additional Embodiment 4

The laminated ceramic capacitor of any one of Additional Embodiments 1 to 3, wherein the first concentration is 10 at % or higher.

Additional Embodiment 5

The laminated ceramic capacitor of any one of Additional Embodiments 1 to 4, wherein the second concentration is 0.5 at % or lower.

Additional Embodiment 6

The laminated ceramic capacitor of Additional Embodiment 1 or 2, wherein the third concentration is 0.5 at % or lower.

Additional Embodiment 7

The laminated ceramic capacitor of Additional Embodiment 1 or 2, wherein a ratio of the first concentration to the third concentration is 10 or greater.

Additional Embodiment 8

The laminated ceramic capacitor of any one of Additional Embodiments 1 to 7, further comprising:
an intermediate layer disposed between the first internal electrode layer and the ceramic layer, the intermediate layer containing a secondary element different from the main component metal element, wherein the secondary element is at least one element selected from the group consisting of As, Au, Co, Cr, Cu, Fe, In, Ir, Mg, Os, Pd, Pt, Re, Rh, Ru, Se, Sn, Ge, Te, W, Y, Ag, and Mo, and wherein a fourth concentration indicating a concentration of the secondary element in the intermediate layer is higher than a fifth concentration indicating a concentration of the secondary element in the first internal electrode layer.

Additional Embodiment 9

The laminated ceramic capacitor of Additional Embodiment 2, wherein in the ceramic layer, a number of the crystal grains interposed between the first internal electrode layer and the second internal electrode layer is three or less.

Additional Embodiment 10

The laminated ceramic capacitor of any one of Additional Embodiments 1 to 9, wherein the sintering agent is a low-melting glass.

Additional Embodiment 11

The laminated ceramic capacitor of any one of Additional Embodiments 1 to 9, wherein the low-melting glass contains at least one substance selected from the group consisting of $SiO_2$, $B_2O_3$, and mixtures of these.

Additional Embodiment 12

The laminated ceramic capacitor of Additional Embodiment 10, wherein the low-melting glass is borosilicate glass or phosphate glass.

Additional Embodiment 13

The laminated ceramic capacitor of any one of Additional Embodiments 1 to 9, wherein the sintering agent is $B_2O_3$ powder, $P_2O_5$ powder, or a mixture of these.

Additional Embodiment 14

A circuit module comprising the laminated ceramic capacitor of any one of Additional Embodiments 1 to 13.

Additional Embodiment 15

An electronic device comprising the circuit module of Additional Embodiment 14.

Additional Embodiment 16

A method of manufacturing a laminated ceramic capacitor, comprising:

a preparation step of preparing a green laminate, the green laminate including a ceramic green sheet and internal electrode patterns, the ceramic green sheet containing a sintering agent, the internal electrode patterns being provided on a first surface and a second surface of the ceramic green sheet;

a first heat treatment step of increasing a temperature of the green laminate to a first top temperature and holding the green laminate at the first top temperature for a first holding time, to obtain a sintered laminate from the green laminate; and a second heat treatment step of holding, after the first heat treatment step, the sintered laminate at a second top temperature for a second holding time, the second top temperature being lower than the first top temperature, wherein in at least one of the first heat treatment step and the second heat treatment step, internal electrode layers including an electrode part and a non-electrode part are formed from the internal electrode patterns, and the sintering agent is transferred into the non-electrode part.

Additional Embodiment 17

The method of Additional Embodiment 16, wherein the internal electrode patterns contain a main component metal element and a secondary element, the secondary element being at least one element selected from the group consisting of As, Au, Co, Cr, Cu, Fe, In, Ir, Mg, Os, Pd, Pt, Re, Rh, Ru, Se, Sn, Ge, Te, W, Y, Ag, Mo, and Ge, and wherein in the first heat treatment step, the internal electrode layers are formed from the internal electrode patterns, a ceramic layer is formed from the ceramic green sheet, and intermediate layers containing the secondary element in a higher concentration than the internal electrode layers are formed between the ceramic layer and the internal electrode layers.

Additional Embodiment 18

The method of Additional Embodiment 16 or 17, wherein the first heat treatment step includes a step of forming the electrode part containing a sintered compact of the main component metal element and transferring the liquid-phase sintering agent into the non-electrode part surrounded by the electrode part.

Additional Embodiment 19

The method of any one of Additional Embodiments 16 to 18, wherein the second heat treatment step includes a step of further transferring the liquid-phase sintering agent into the non-electrode part.

What is claimed is:

1. A laminated ceramic capacitor, comprising:

a body having a first internal electrode layer, a second internal electrode layer, and a ceramic layer disposed between the first internal electrode layer and the second internal electrode layer, the ceramic layer being formed of ceramic material containing a sintering agent composed mainly of a sintering agent element;

a first external electrode provided on the body so as to be electrically connected to the first internal electrode layer; and a second external electrode provided on the body so as to be electrically connected to the second internal electrode layer, wherein the first internal electrode layer includes an electrode part and a non-electrode part, the electrode part being formed of a sintered compact of a main component metal element, the non-electrode part being surrounded by the electrode part and containing the sintering agent element, and wherein a first concentration indicating a concentration of the sintering agent element in the non-electrode part is higher than a second concentration indicating a concentration of the sintering agent element in an interface between the first internal electrode layer and the ceramic layer.

2. The laminated ceramic capacitor of claim 1, wherein the ceramic layer contains a plurality of crystal grains each formed of a sintered compact of the ceramic material, and wherein the first concentration is higher than a third concentration indicating a concentration of the sintering agent element in grain boundaries of the crystal grains.

3. The laminated ceramic capacitor of claim 2, wherein the third concentration is higher than the second concentration.

4. The laminated ceramic capacitor of claim 2, wherein the third concentration is 0.5 at % or lower.

5. The laminated ceramic capacitor of claim 2, wherein a ratio of the first concentration to the third concentration is 10 or greater.

6. The laminated ceramic capacitor of claim 2, wherein in the ceramic layer, a number of the crystal grains interposed between the first internal electrode layer and the second internal electrode layer is three or less.

7. The laminated ceramic capacitor of claim 1, wherein the first concentration is 10 at % or higher.

8. The laminated ceramic capacitor of claim 1, wherein the second concentration is 0.5 at % or lower.

9. The laminated ceramic capacitor of claim 1, further comprising:

an intermediate layer disposed between the first internal electrode layer and the ceramic layer, the intermediate layer containing a secondary element different from the main component metal element, wherein the secondary element is at least one element selected from the group consisting of As, Au, Co, Cr, Cu, Fe, In, Ir, Mg, Os, Pd, Pt, Re, Rh, Ru, Se, Sn, Ge, Te, W, Y, Ag, and Mo, and wherein a fourth concentration indicating a concentration of the secondary element in the intermediate layer is higher than a fifth concentration indicating a concentration of the secondary element in the first internal electrode layer.

10. The laminated ceramic capacitor of claim 1, wherein the sintering agent is a low-melting glass.

11. The laminated ceramic capacitor of claim 10, wherein the low-melting glass contains at least one substance selected from the group consisting of $SiO_2$, $B_2O_3$, and mixtures of these.

12. The laminated ceramic capacitor of claim 10, wherein the low-melting glass is borosilicate glass or phosphate glass.

13. The laminated ceramic capacitor of claim 1, wherein the sintering agent is $B_2O_3$ powder, $P_2O_5$ powder, or a mixture of these.

14. A circuit module comprising the laminated ceramic capacitor of claim 1.

15. An electronic device comprising the circuit module of claim 14.

* * * * *